United States Patent
Carrozza et al.

(10) Patent No.: US 9,296,001 B2
(45) Date of Patent: *Mar. 29, 2016

(54) BICYCLE HYDRATION AND COOLING SYSTEM

(71) Applicant: Spruzza LLC, Folsom, CA (US)

(72) Inventors: David Carrozza, Folsom, CA (US); Cameron Carrozza, Sacramento, CA (US)

(73) Assignee: SPRUZZA LLC, Folsom, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/503,341

(22) Filed: Sep. 30, 2014

(65) Prior Publication Data

US 2015/0014439 A1 Jan. 15, 2015

Related U.S. Application Data

(63) Continuation-in-part of application No. 14/269,898, filed on May 5, 2014, now Pat. No. 9,186,691, which is a continuation-in-part of application No. 13/675,135, filed on Nov. 13, 2012, now Pat. No. 8,714,464, which is a continuation-in-part of application No. 13/309,527, filed on Dec. 1, 2011, now abandoned.

(51) Int. Cl.
*B05B 9/043* (2006.01)
*B05B 9/08* (2006.01)
(Continued)

(52) U.S. Cl.
CPC ............. *B05B 9/08* (2013.01); *B05B 11/3057* (2013.01); *B05B 15/061* (2013.01); *B62J 99/00* (2013.01);
(Continued)

(58) Field of Classification Search
CPC  B05B 11/3057; B05B 15/061; B05B 1/3026; B05B 9/0833; B05B 9/0838; B05B 15/066; B05B 9/08; B62J 99/00; B62K 21/00; B62K 19/40; B65D 83/42; B65D 83/64

USPC ......... 239/128, 289, 329, 332, 333, 337, 373, 239/390, 443, 600; 62/304, 306, 314; 222/608; 280/288.4
See application file for complete search history.

(56) References Cited

U.S. PATENT DOCUMENTS

| 4,807,813 A | 2/1989 | Coleman |
| 4,815,635 A | 3/1989 | Porter |

(Continued)

FOREIGN PATENT DOCUMENTS

WO   WO/2009/058724 A3   5/2009

OTHER PUBLICATIONS

PCT International Search Report, International Appl. No. PCT/US2012/066805, Dec. 26, 2012.

*Primary Examiner* — Steven J Ganey
(74) *Attorney, Agent, or Firm* — Inventive Patent Law P.C.; Jim H. Salter

(57) ABSTRACT

Various embodiments provide a bicycle hydration and misting system or apparatus. Example embodiments include a manual (e.g., trigger-activated) or automated (e.g., valve-activated) system that is self-contained, small, and lightweight. Various embodiments improve safety, allow convenient interchangeability of the fluid reservoir, and enable easy installation on a bicycle with or without a mounting system on the bicycle itself. Embodiments also allow the rider to select a variety of spray types, stream, spray, or mist depending on the intended use or amount of fluid desired for each release. The various embodiments provide for an improved cooling fluid delivery system of design simplicity, ease of use, and interchangeability that allows a cyclist an evaporative cooling concept safely, efficiently and conveniently, while riding in conditions of elevated or extreme temperatures.

16 Claims, 14 Drawing Sheets

(51) Int. Cl.
- *B05B 15/06* (2006.01)
- *B62J 99/00* (2009.01)
- *B05B 11/00* (2006.01)
- *B62K 21/00* (2006.01)
- *B62K 19/40* (2006.01)
- *B05B 1/30* (2006.01)
- *B65D 83/42* (2006.01)
- *B65D 83/64* (2006.01)

(52) U.S. Cl.
CPC ........... *B62K 19/40* (2013.01); *B62K 21/00* (2013.01); *B05B 1/3026* (2013.01); *B05B 9/0833* (2013.01); *B05B 9/0838* (2013.01); *B05B 15/066* (2013.01); *B65D 83/42* (2013.01); *B65D 83/64* (2013.01)

(56) References Cited

U.S. PATENT DOCUMENTS

| | | | | |
|---|---|---|---|---|
| 4,911,339 | A | 3/1990 | Cushing | |
| 5,115,952 | A | 5/1992 | Jenkins | |
| 5,119,978 | A | 6/1992 | Kalamaras | |
| 5,143,390 | A | 9/1992 | Goldsmith | |
| 5,158,218 | A | 10/1992 | Wery | |
| 5,160,071 | A | 11/1992 | Wright | |
| 5,201,442 | A * | 4/1993 | Bakalian | 222/608 |
| 5,215,231 | A | 6/1993 | Paczonay | |
| 5,301,858 | A | 4/1994 | Hollander | |
| 5,326,124 | A | 7/1994 | Allemang | |
| 5,607,087 | A | 3/1997 | Wery | |
| 5,645,404 | A | 7/1997 | Zelenak | |
| 5,740,948 | A | 4/1998 | Chu | |
| 5,755,368 | A | 5/1998 | Bekkedahl | |
| 5,788,134 | A | 8/1998 | Matic, Jr. | |
| 5,967,415 | A | 10/1999 | Utter | |
| 6,151,907 | A | 11/2000 | Hale | |
| 6,196,474 | B1 | 3/2001 | Hillerson | |
| 6,401,997 | B1 | 6/2002 | Smerdon, Jr. | |
| 6,481,642 | B1 | 11/2002 | Louis, Jr. | |
| 6,953,135 | B2 | 10/2005 | Litton | |
| 7,458,528 | B2 | 12/2008 | Ridgeway | |
| 7,997,561 | B2 | 8/2011 | Goldmann | |
| 8,714,464 | B2 * | 5/2014 | Carrozza et al. | 239/333 |
| 2004/0090040 | A1 | 5/2004 | Pearson | |
| 2007/0170280 | A1 | 7/2007 | Ridgeway | |
| 2007/0210122 | A1 | 9/2007 | Giovannoni | |
| 2009/0108087 | A1 | 4/2009 | Goldmann | |
| 2011/0120676 | A1 | 5/2011 | Chandler | |

* cited by examiner

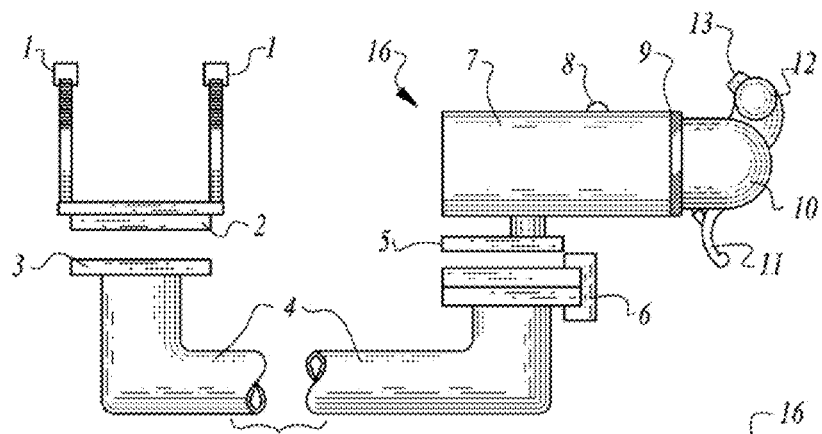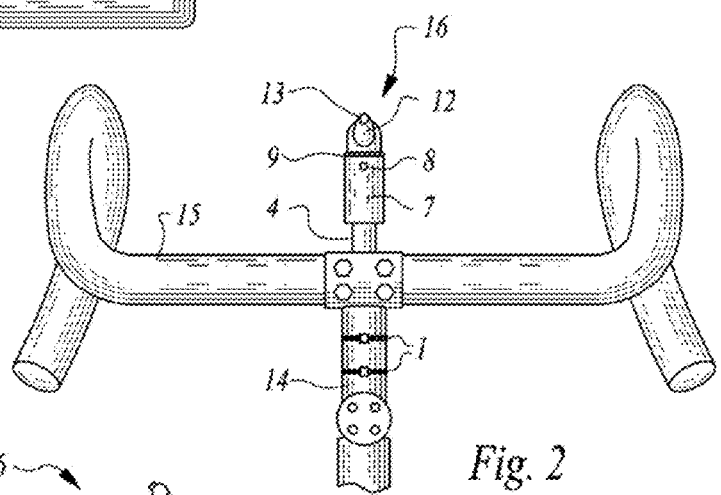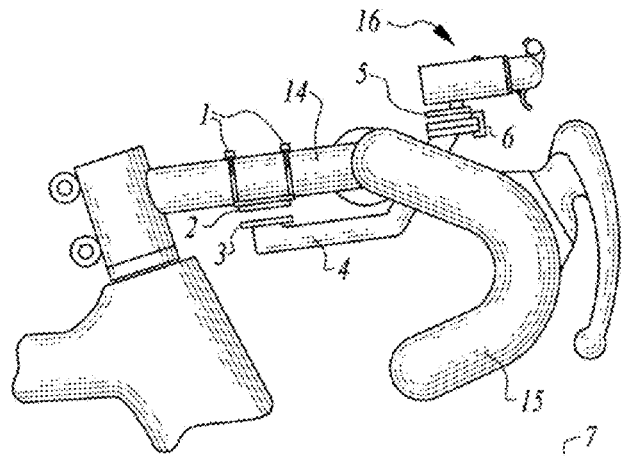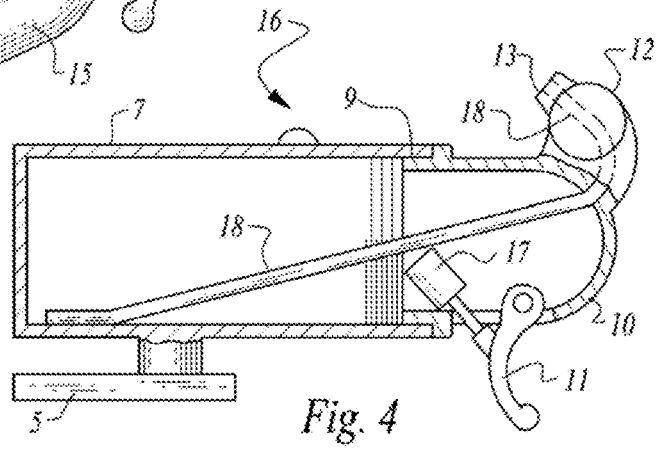
Fig. 1
Fig. 2
Fig. 3
Fig. 4

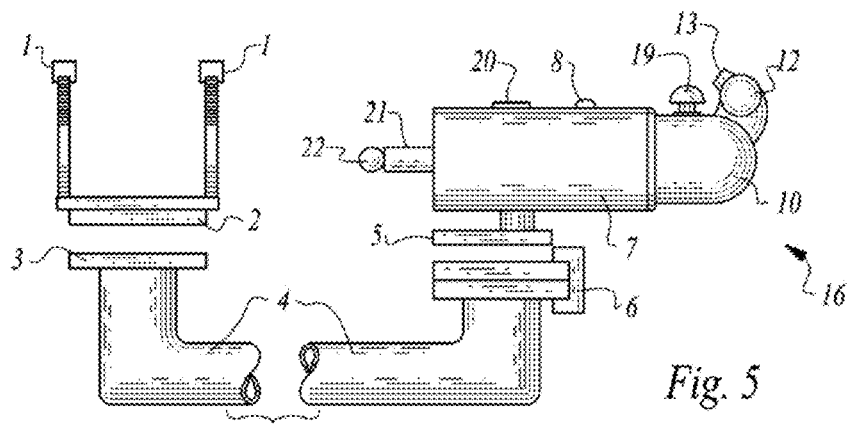
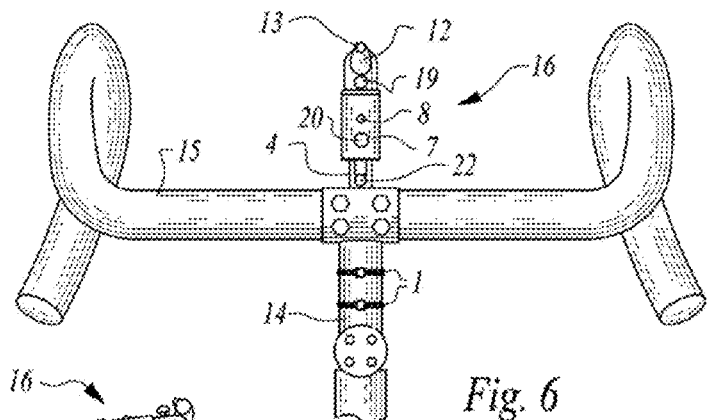
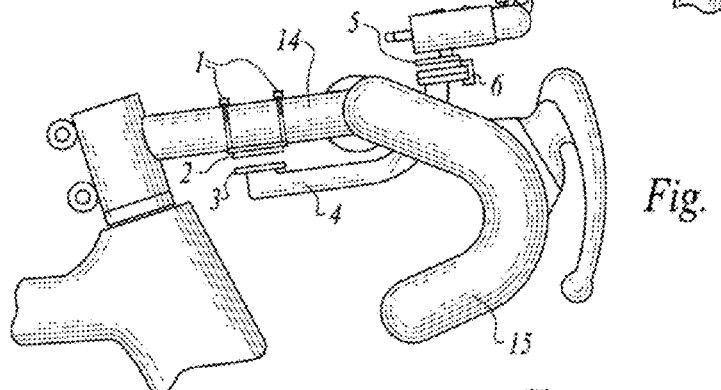
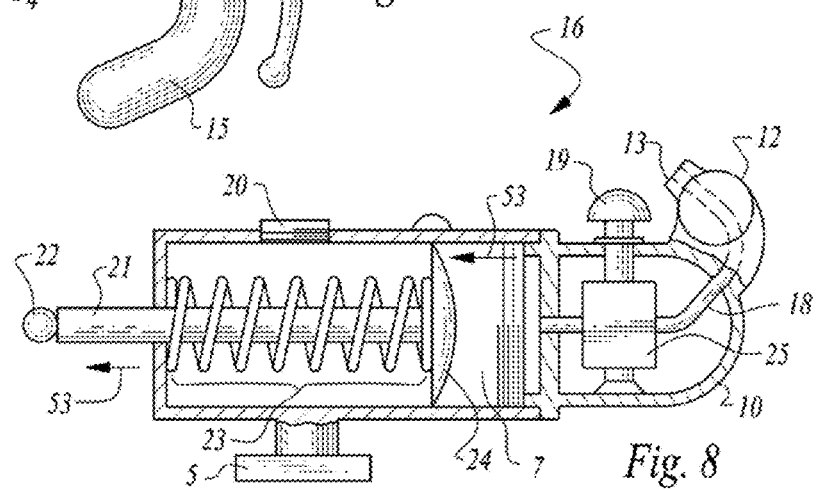

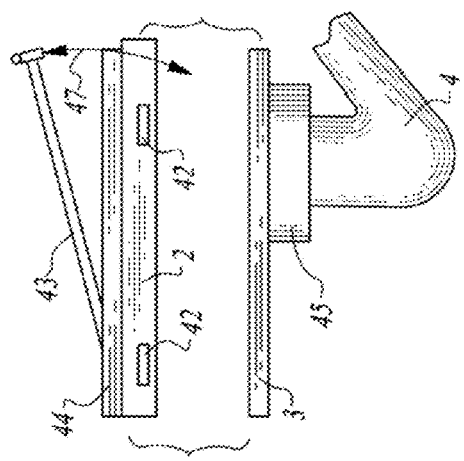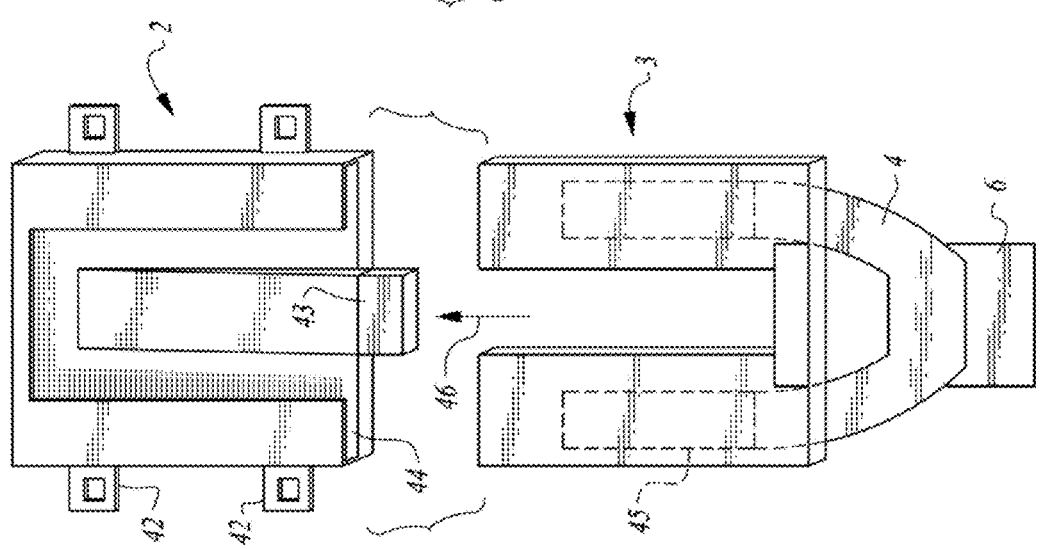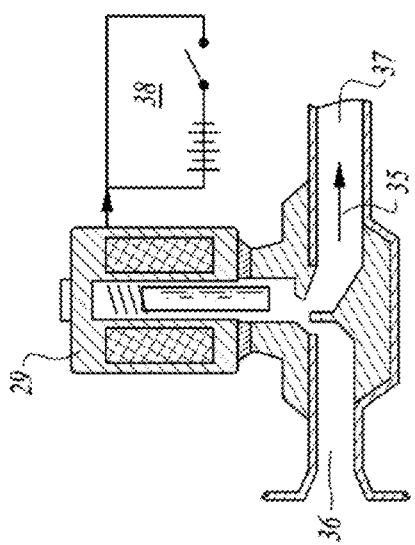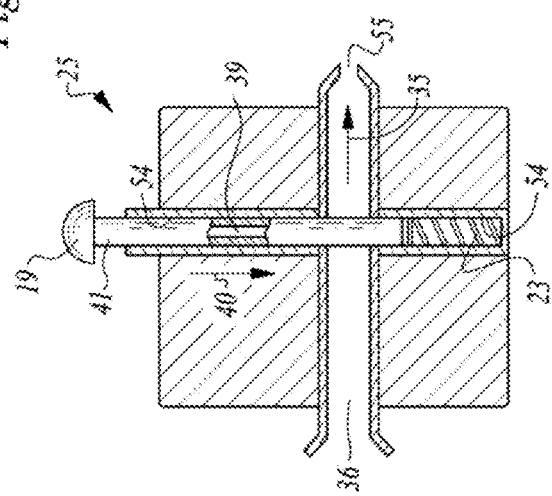

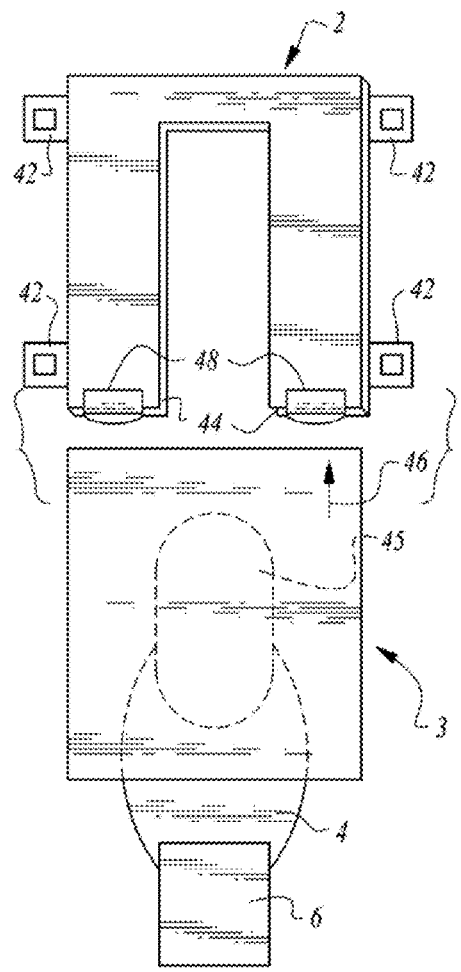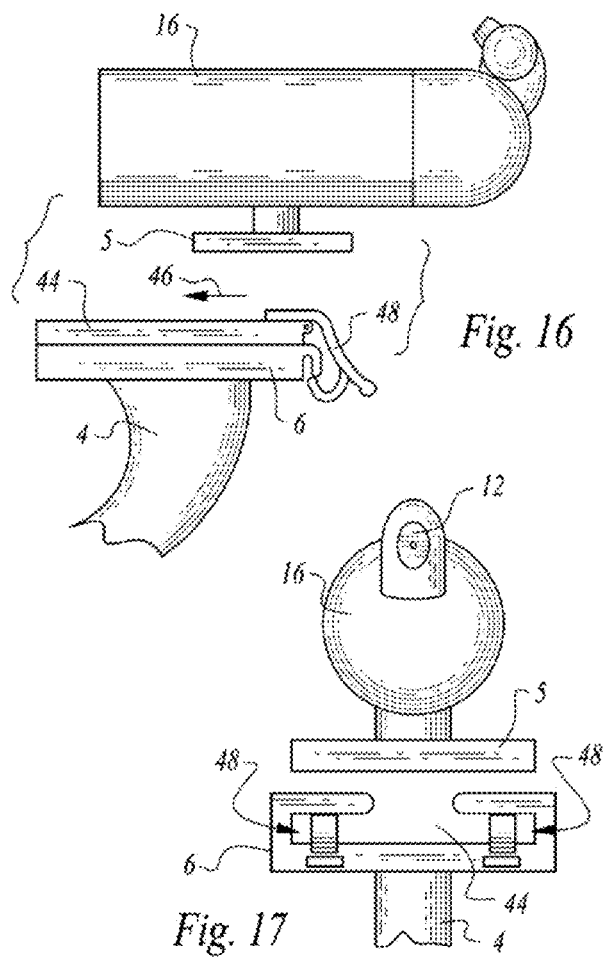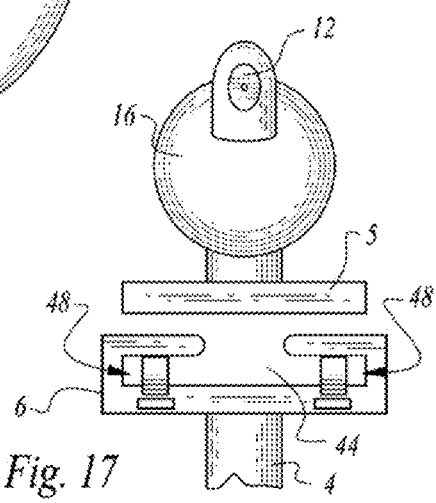
Fig. 15
Fig. 16
Fig. 17
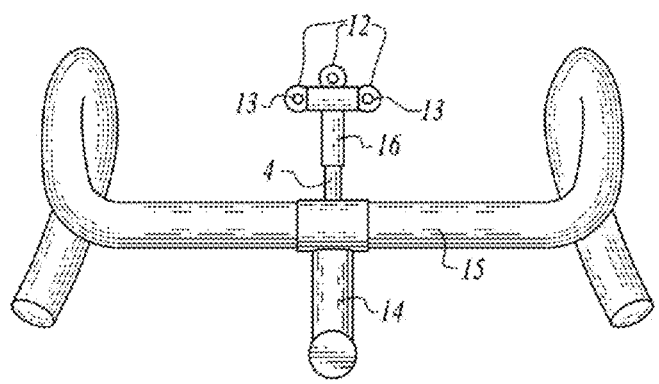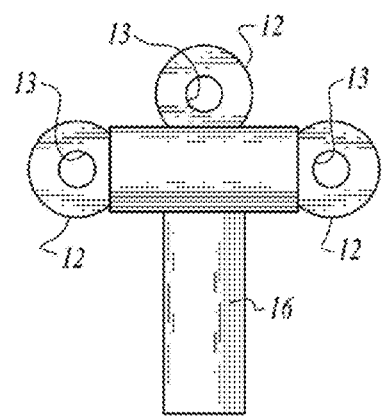
Fig. 18
Fig. 19

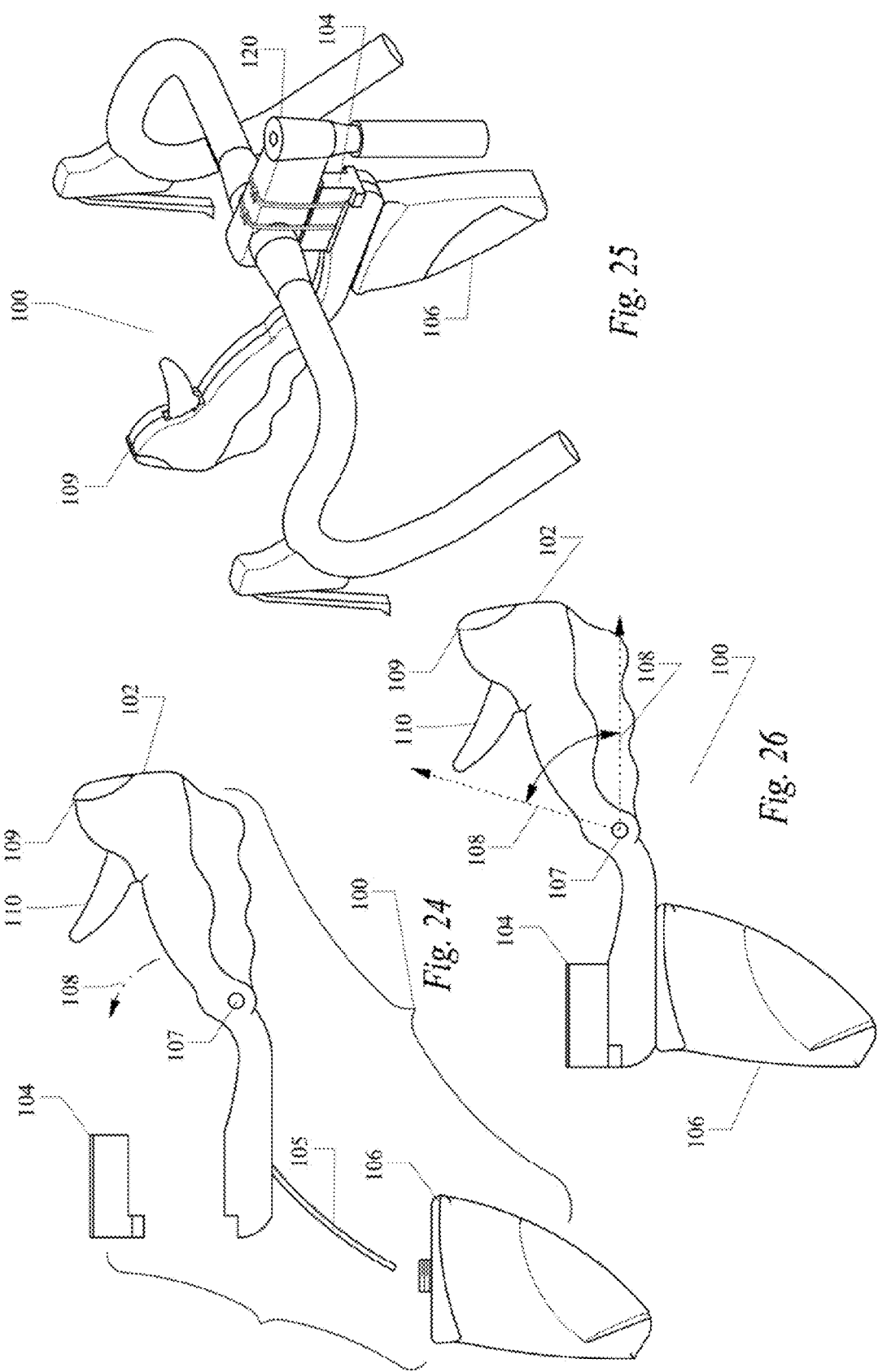

BICYCLE HYDRATION AND COOLING SYSTEM

PRIORITY PATENT APPLICATIONS

This is a continuation-in-part patent application of U.S. patent application Ser. No. 14/269,898; filed May 5, 2014 by the same applicant, which is a continuation-in-part patent application of U.S. patent application Ser. No. 13/675,135; filed Nov. 13, 2012 by the same applicant, issued as U.S. Pat. No. 8,714,464, which is a continuation-in-part patent application of U.S. patent application Ser. No. 13/309,527; filed Dec. 1, 2011 by the same applicant, now abandoned. This present patent application draws priority from the referenced patent applications. The entire disclosure of the referenced patent applications is considered part of the disclosure of the present application and is hereby incorporated by reference herein in its entirety.

TECHNICAL FIELD

The disclosed subject matter relates to the field of personal hydration and cooling systems, and particularly to hydration and cooling systems for bicycles.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2014, David Carrozza and Cameron Carrozza, All Rights Reserved.

BACKGROUND

Bicyclists or other types of riders often lack the ability to conveniently and safely utilize the cooling effects of evaporation, which often is the only physiologically successful mechanism of discharging body heat when ambient temperatures are significantly above body temperature. This need to discharge heat becomes even more pronounced during periods of exercise or muscular activity whether light, moderate or intense; although, the requisite need rises proportionally. In addition, the physiology of heat dissipation and circulation are such that when the body has to balance the need to supply blood to working muscles as well as to the skin in order for heat to be released through radiation, convection or evaporation, the ability to effect "cooling" is only through evaporation when ambient temperatures are above body/skin temperature. Thus, an effective evaporative cooling system allows more blood to be shunted to the working muscles instead of to the skin for heat transfer. This evaporative cooling effect allows for better, more sustainable and psychologically "comfortable" levels of activity or performance.

The physics of cooling through evaporation results when energy or heat is lost as water, or other liquid coolant, goes from a liquid to a gas phase. This cooling effect on the body only occurs at the skin when water on the skin undergoes this phase change. Consequently, traditional or customary mechanisms to cool oneself, such as dumping water over the head, are very inefficient in that none of the water that "falls off the skin" provides any significant or lasting cooling effect. Only the layer of water that "sticks" to the skin provides a basis for the evaporative cooling effect. In practical terms, this often means that any techniques that provide excess water delivery to the skin of a rider are typically wasteful and inefficient. Riders, especially during longer rides and/or under conditions of extreme or elevated temperatures, often have to carry extra water and while riding balance its use for both hydration and cooling purposes. Unfortunately, water is heavy and the current and customary water containers influence performance in terms of weight, space on the bike, and wind resistance. Conventional cooling systems for riders are inefficient in terms of space, weight, volume, and/or wind-resistance on the bike frame.

SUMMARY

In various embodiments, there is described herein an evaporative cooling mechanism designed to provide evaporative cooling for a bicyclist, to mount on a bicycle frame or for integration into a bicycle frame, and to allow cyclists to easily, conveniently and safely use, interchange, and remove the cooling system. The various embodiments represent an improvement in terms of simplicity of design, functionality, safety, weight, space, utility and integration into the look and feel of the bicycle frame itself. Such improvements may allow for improved acceptance and use by the cycling community, which will thus improve the overall, comfort, enjoyment, performance and safety of bicycling. The various embodiments relate to, for example, a single self-contained unit in a manual or automated configuration and an integrated in-frame design as fully described herein.

The manual configuration, in a particular embodiment, does not require a closed or pressurized system. The resulting simplicity of design creates a cost structure low enough that the retail pricing allows for relative affordability to the cycling consumer seeking the benefits intended.

The automated design configuration, in a particular embodiment, is a closed system providing simplicity of design and pressure in the closed system. This configuration allows for an actuation of spray through a valve mechanism rather than a triggering system that pumps the pressure into the system.

In the manual and automated configurations, the system's design benefits improve conventional attempts to provide either cooling or hydration to cyclists. One advantage of the automated system of an embodiment is providing a more convenient way to actuate the release/dispensing of fluid from the reservoir and through the nozzle.

The various embodiments enabled can be categorized as follows:

Simplicity of design as evidenced by the reduced number of individual parts and their simplicity in operation Ease of installation on the bicycle frame Ease of "disassembly" of the device when not in use or desired Interchangeability of the fluid reservoir and mounting assembly The significant reduction in size, space, location, and weight of the fluid reservoir necessary on the bicycle frame The adjustable type of spray that can be dispensed from the nozzle. The nozzle provides an adjustable type of spray that allows the rider to change the spray from stream, to spray, to mist depending on the use and amount of fluid desired to be discharged.

The simplicity and cost effectiveness of the spring loaded plunger mechanism

The type and location of the triggering pump system in the manual configuration

The type and method of pressurization using the $CO_2$ cartridge in the in-frame design The type and location of the actuator valve in the automated system The position, forwardly-projected, of the fluid reservoir and nozzle which allows for improved heads-up use of a particular embodiment The design and the relationship of the component parts allows for the maximum use of fluid for cooling.

The low cost structure, particularly of the manual system, allows for an improved entry into the intended cyclist market.

The design and use of interchangeable component parts will allow for affordable and convenient replacement of such parts as they may wear or are damaged over time and use.

The various embodiments represent an improvement and ease of use for cyclists that will find acceptance in the cycling industry. The beneficial features of the various embodiments can lead to among the following results:

Ride safer—reduced risk of heat intolerance issues

Ride safer while using an evaporative cooling device

Ride more comfortably

Ride for longer periods of time during conditions of elevated temperature

Improve performance during conditions of elevated temperature

Enable riders to ride during conditions of extreme heat, who otherwise may not ride Perhaps expand the number of individuals who will find cycling an activity they enjoy in environments where elevated and/or extreme heat conditions exist.

BRIEF DESCRIPTION OF THE DRAWINGS

Embodiments are illustrated by way of example and not limitation in the figures of the accompanying drawings, in which:

FIGS. 1 through 4 illustrate the manual/trigger-activated or manual-trigger design of an example embodiment. In particular, FIG. 1 is a side view schematic. FIG. 2 a top view schematic. FIG. 3 is a side view of the system's attachment on a bike frame. FIG. 4 is a side view detail showing the internal and external structure of the manual/trigger-activated embodiment;

FIGS. 5 through 8 illustrate the automated valve-actuated design of an example embodiment. In particular, FIG. 5 is an exterior, side view schematic. FIG. 6 is a top view exterior schematic. FIG. 7 is a representation of the system's attachment on the bike frame. FIG. 8 is an interior view schematic of the automated valve-actuated embodiment;

FIG. 11 illustrates the general design of an example embodiment of the normally closed solenoid valve that controls the flow of the pressurized liquid from the fluid reservoir to the adjustable spray nozzle;

FIG. 12 illustrates the general design of the normally closed automated valve used in an example embodiment;

FIGS. 13 and 14 illustrate an example embodiment of a flange-lock design wherein clips provide for the attachment and connection of the assembly riser and the spray unit to the bicycle frame and to each other;

FIGS. 15, 16, and 17 illustrate an example embodiment of a snap clip design wherein clips provide for the attachment and connection of the assembly riser and the spray unit to the bicycle frame and to each other;

FIGS. 18 and 19 illustrate a modification of the spray nozzle in an example embodiment to include multiple nozzles that may be independently adjusted as to their direction of spray;

FIGS. 20 and 21 illustrate a variety of attachment designs and attachment locations for the manual-trigger embodiment, while the location and function of the spray unit remains the same. FIGS. 22 and 23 illustrate alternate attachment designs and attachment locations for the automated embodiments, while the location and function of the spray unit remains the same;

FIGS. 24 through 26 illustrate another example embodiment of a bicycle misting system having separable components;

DETAILED DESCRIPTION

Figure 9:
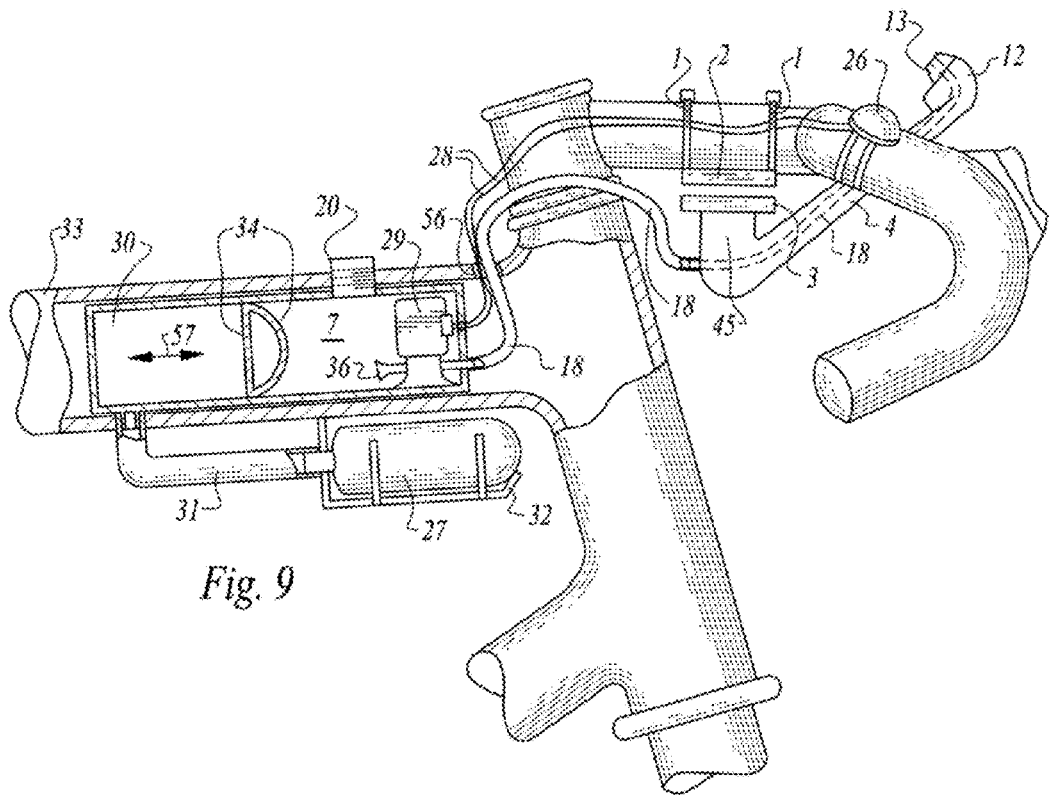
FIGS. 9 and 10 illustrate the in-frame design of an example embodiment, in both its internal working, mounting, and integration in the bike frame.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there are described and claimed embodiments of a bicycle hydration and misting system or apparatus. The various embodiments described herein provide a bicyclist or other type of rider with the ability to conveniently and safely utilize the cooling effects of evaporation, which often is the only physiologically successful mechanism of discharging body heat when ambient temperatures are significantly above normal body temperature. The various embodiments described herein represent a significant improvement over current cooling and hydration strategies and practices in that the various embodiments provide for an extremely efficient system for cooling that does not compete for space, weight, volume or wind-resistance on the bike frame. This allows a rider to maximize carrying capacity of fluid for both hydration and cooling purposes. A detailed description of various example embodiments of the bicycle hydration and misting system or apparatus is provided below.

In each of the described examples, the various embodiments provide a portable, easily assembled, interchangeable, and self-contained device and system that allows a bicyclist to carry sufficient and minimal amounts of water or other suitable fluid necessary to dispense such fluid onto the cyclist's face, mouth and upper torso, with the intent of providing an evaporative cooling effect. In the described embodiments, the cooling fluid dispensed by the system can be plain water, distilled water, water with additives to enhance evaporative effect, water with additives for sun protection of the skin, water with fragrance additives, or other fluids designed to enhance evaporative or cooling effects when applied to the skin.

Referring now to FIGS. 1 through 4, the manual/trigger-activated or manual-trigger design of an example embodiment is illustrated. In particular, FIG. 1 is a side view schematic of an example embodiment. FIG. 2 a top view schematic of an example embodiment. FIG. 3 is a side view of the system's attachment on a bike frame. FIG. 4 is a side view detail showing the internal and external structure of the manual/trigger-activated embodiment. See also FIGS. 20 and 21 for other example embodiments of the manual/trigger-activated or manual-trigger system.

Referring now to FIG. 1, zip ties 1 are used to attach the female stem bracket 2 to the handlebar stem 14 (see FIG. 2) on the bottom side. The female stem bracket 2 receives the male stem bracket 3, which is integral to or molded into the assembly riser 4 that projects forwardly and upwardly between the handlebars 15 and terminates into the female spray unit bracket 6 located in front of, between and slightly above the handlebars 15. The female spray unit bracket 6, in turn, receives/connects to the male spray unit bracket 5 that is integral to or molded into the spray unit for both the manual-trigger and automated-valve embodiments. Thus, the spray unit 16 is attached to the bicycle frame by means of two clips or connectors, the male-female stem brackets 2 & 3 and the male-female spray unit brackets 5&6.

FIG. 1 also illustrates the presence and location of the trigger 11, which actuates the spray/spraying of the fluid through the adjustable spray nozzle 13 located on the angled and posterior-facing spray head 12. Two additional design features/functions of this embodiment are represented by the screw cap 10 and screw on thread location 9. This feature allows the user the means for filling the fluid reservoir 7 and subsequently resealing/closing the spray unit 16. Lastly, in FIG. 1, the slightly raised ridge 8, referred to herein as the push-off ridge, allows the rider to push against this ridge in order to remove the spray unit 16 after unclipping/releasing the male-female spray unit brackets 5&6 in order to exchange a used or emptied spray unit 16 with an unused or filled spray unit 16.

Referring now to FIG. 2, the manual-trigger embodiment is shown from the top-down perspective and illustrates an overview of the spray unit 16 with the features as seen from the rider's perspective while seated on the bicycle. As shown in FIG. 2, zip ties 1 are seen as they appear looking down on to the handlebar stem 14. The forwardly projected assembly riser 4 that terminates on one end at the male-female spray unit brackets 5&6 (see FIG. 1) is shown. The forwardly projected assembly riser 4 provides for the removable connection of the spray unit 16 to the bicycle frame as shown in FIG. 2. As will be described in more detail below, the spray unit 16 includes the spray head 12, the adjustable nozzle 13, the fluid reservoir 7, threads 9, and the push-off ridge 8. FIG. 2 shows the relative location of the fluid reservoir 7 of the spray unit 16 and the location of the threads 9 that seal the spray cap 10 to the fluid reservoir 7. FIG. 2 also illustrates the general location of the spray unit 16 at a position forward and between the handlebars 15.

Referring now to FIG. 3, the manual-trigger embodiment is shown as it appears in a side view. The relative locations of the external features and functions in this example embodiment are illustrated in reference to each other and to the bicycle frame. As shown in FIG. 3, zip ties 1 secure the female stem bracket 2 to the handlebar stem 14 in a single-point post mounting position. The male stem bracket 3 removably connects the assembly riser 4 to the handlebar stem 14 and projects forward and upward between the handlebars 15. The assembly riser 4 terminates at the female spray unit bracket 6, which connects the spray unit 16 to the assembly riser 4 by means of the molded/integrated male spray unit bracket 5 as shown in FIG. 3.

Referring now to FIG. 4, the manual-trigger embodiment is shown as it appears in a side view and illustrating the internal structure of the manual-trigger embodiment of spray unit 16. This illustration provides an internal view of the features, functions, and mechanisms of the manual-trigger design. Foremost as seen in FIG. 4 are the design, location, and relative relationships involved in the pumping of cooling fluid using a trigger-activated mist dispenser from the fluid reservoir 7 though a plastic tube (transfer tubing) 18 by means of existing technology, such as a one-way reciprocating pump 17 that itself is actuated/activated by means of the trigger 11 located on the exterior and ventral (i.e., bottom) side of the spray cap 10.

FIG. 4 illustrates the fluid reservoir 7 or container for holding the fluid to be dispensed as a stream, spray, or mist for cooling. FIG. 4 also illustrates the plastic tube 18, the one-way reciprocating pump 17, and the trigger 11. When the operator actuates the trigger 11, fluid is pumped from the posterior portion of the fluid reservoir 7 forward through the plastic tubing 18 through the angled spray head 12 and is finally discharged from the adjustable spray nozzle 13 as a stream, spray, or mist as desired and selected by the operator. As shown in FIG. 4, the fluid is discharged from the adjustable spray nozzle 13 in a posterior (i.e., rearward) direction, upward, and toward the rider's face or torso, enabling a maximum heads-up position for the rider during use of the spray unit 16. Lastly, the relative location of the push-off ridge 8 is illustrated as is the male spray unit bracket 5 that is integral or molded into the spray unit 16. As shown in FIGS. 1 through 4, example embodiments provide an interchangeable, clip or snap-in mounting system that allows for separate points of attachment, assembly and interchangeability for the rider to use to assemble, disassemble, or replace component parts. The various embodiments provide a means for connecting/attaching the entire assembly to either the handlebars or the handlebar stem depending on the preference of the user.

FIGS. 5 through 8 illustrate the automated valve-actuated or automated-valve design of an example embodiment. In particular, FIG. 5 is an exterior, side view schematic of an example embodiment. FIG. 6 is a top view exterior schematic of an example embodiment. FIG. 7 is a representation of the system's attachment on the bike frame. FIG. 8 is an interior view schematic of the automated valve-actuated embodiment. As can be readily seen and appreciated, the attachment mechanisms shown in FIGS. 1 through 4 and described above for the manual-trigger embodiments are similar in most respects to the attachment mechanisms used for the automated-valve embodiments.

Referring now to FIG. 5, an automated-valve embodiment is shown in an exterior, side view schematic. The example embodiment is shown to include a plunger 21 and plunger knob 22, which allows the user to pull back on the plunger head (see FIG. 8, plunger head 24) thus expanding/increasing the space or volume for fluid in the fluid reservoir 7. In this embodiment, it will also be observed that the automated-valve button 19 is located on the top of, and the anterior portion of, the spray unit 16. Another observable feature in this embodiment is the type and location of the opening that allows the user to fill the fluid reservoir 7 with fluid. The fill hole/cap 20, is located on the top and posterior portion of the spray unit 16. As mentioned above, the remaining features of this embodiment shown in FIG. 5 are similar in form and function as described in reference to FIG. 1. In particular, zip ties 1 are used to attach the female stem bracket 2 to the handlebar stem 14 (see FIG. 6) on the bottom side. The female stem bracket 2 receives the male stem bracket 3, which is integral to or molded into the assembly riser 4 that projects forwardly and upwardly between the handlebars 15 and terminates into the female spray unit bracket 6 located in front of, between and slightly above the handlebars 15. The female spray unit bracket 6, in turn, receives/connects to the male spray unit bracket 5 that is integral to or molded into the spray unit 16 for both the manual-trigger and automated-valve embodiments. Thus, the spray unit 16 is attached to the bicycle frame by means of two clips or connectors, the male-female stem brackets 2 & 3 and the male-female spray unit brackets 5&6.

Referring now to FIG. 6, an automated-valve embodiment is shown in a top-down view as would be seen from a rider's perspective when seated on the bicycle. The zip ties 1 attach the female stem bracket 2 (see FIG. 5) to the handlebar stem 14. As described in more detail below, the automated-valve embodiment of the spray unit 16 is comprised of the fluid reservoir 7, the push-off ridge 8, the fill hole/cap 20, the automated-valve button 19, the spray head 12, and the adjustable spray nozzle 13. The automated-valve embodiment of the spray unit 16 is removably connected to the bicycle frame by way of the assembly riser 4, as shown in FIG. 5.

Referring now to FIG. 7, an automated-valve embodiment is shown in a side view. The relative locations of the external features and functions in this example embodiment are illustrated in reference to each other and to the bicycle frame. As shown in FIG. 7, zip ties 1 secure the female stem bracket 2 to the handlebar stem 14. The male stem bracket 3 removably connects the assembly riser 4 to the handlebar stem 14 and projects forward and upward between the handlebars 15. The assembly riser 4 terminates at the female spray unit bracket 6, which connects the spray unit 16 to the assembly riser 4 by means of the molded/integrated male spray unit bracket 5 as shown in FIG. 7.

Referring now to FIG. 8, the automated-valve embodiment is shown as it appears in a side view and illustrating the internal structure of the automated-valve embodiment of spray unit 16. This illustration provides an internal view of the features, functions, and mechanisms for the automated-valve design. Two features embody differences from the manual-trigger embodiment described above. These two features are the mechanism for discharging the fluid contained in the fluid reservoir 7 and the means for actuating the spray in the automated-valve embodiment. These two elements are represented by the plunger spring 23 and the normally closed valve actuator 25 as shown in FIG. 8.

In the example automated-valve embodiment shown in FIG. 8, the spray unit 16 is a closed system, where the only opening into the fluid reservoir 7 is through the fill cap 20 located slightly forward of the end of the spray unit 16. The fill cap/opening provides the means of pouring/filling the fluid reservoir 7 with cooling fluid and then by closing, maintains the fluid in an air-tight condition inside the fluid reservoir 7 on the anterior side of the plunger head 24. Prior to filling the fluid reservoir 7, the operator pulls the plunger knob 22 rearward in the direction represented by the arrow 53 shown in FIG. 8. This action increases the space in the fluid reservoir 7 to contain fluid, thus increasing the volume for fluid that the rider can carry for cooling purposes. When the fluid reservoir 7 is filled, the fill cap 20 is replaced and screwed tightly to maintain and/or create water/air tight conditions. The operator can then release the tension on the plunger 21 and plunger knob 22. Once the fill cap is sealed and tension on plunger 21 is released, the plunger spring 23 pushes the head of the plunger 24 forward, creating pressure on the fluid in the now-closed system. This pressurized and closed system represents a different mechanism/method for discharging the fluid to and through the adjustable spray nozzle 13 as compared to the manual-trigger embodiment described above. In the manual-trigger embodiment, the fluid is pumped to/through the adjustable spray nozzle 13 by way of a reciprocating pump 17. In the automated-valve embodiment, the fluid is forced to/through the adjustable spray nozzle 13 by way of a pressure created in the fluid reservoir 7 by plunger spring 23 and other pressure-producing mechanisms as described herein.

As shown in FIG. 8, the normally closed automated-valve 25 allows the operator to actuate and control the timing and duration (i.e., the amount) of the discharged/sprayed fluid using a valve-activated mist dispenser. The discharge of fluid from the fluid reservoir 7 is managed by the operator when the valve-actuator button 19 is depressed/activated. FIG. 12, described in more detail below, illustrates the working mechanism of the automated-valve 25 of an example embodiment.

Referring now to FIG. 12, the automated-valve 25 is normally closed, so the fluid pathway indicated by arrow 35 (see FIGS. 11 and 12) that enters on the pressurized side 36 is blocked by the plunger 41 (see FIG. 12), which is held up by the pressure exerted by a spring 23 located in the bottom of the plunger channel 54. When the operator depresses the automated-valve button 19, the plunger travels in the direction indicated by arrow 40 until the plunger orifice/opening 39 reaches the predetermined set point or position, which results in the plunger orifice/opening 39 being perfectly aligned with the path of the fluid from input opening 36 in the direction of arrow 35 and out the valve port 55, which leads to the adjustable spray nozzle 13 (see FIG. 8). The fluid will be discharged/sprayed as long as the operator maintains the downward pressure on the automated-valve button 19. This feature allows the operator to control both the time and duration of the spray discharge. When the pressure on the automated-valve button 19 is released, the spring 23 located in the bottom of the plunger channel 54 forces the plunger 41 and plunger orifice 39 upward, again blocking or disrupting the flow of fluid under pressure from the fluid reservoir 7, through the input opening 36 and valve port 55 to the adjustable spray nozzle 13.

The other components and features of the automated-valve embodiment of FIGS. 5 through 7 have similar features and function as in the manual-trigger embodiments shown in FIGS. 1 through 3 and described above.

Figure 10:
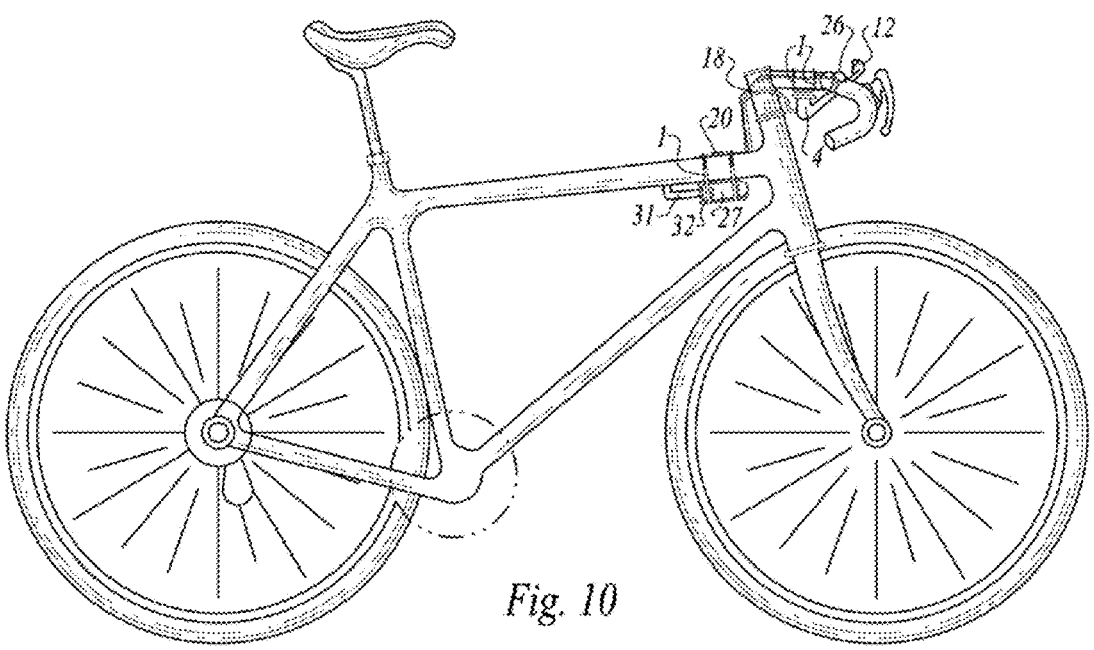

FIGS. 9 and 10 illustrate the in-frame design of an example embodiment, in both its internal working, mounting, and integration in the bicycle frame. The in-frame design of an example embodiment integrates the fluid reservoir 7 and the normally closed valve 29 into a structural element of a bicycle frame as shown in FIG. 9. The in-frame embodiment uses the principle of a pressurized/closed system as a means to discharge the fluid through the adjustable spray nozzle 13 and the normally closed valve 29. A detail view of the normally closed valve 29 is shown in FIG. 11. The in-frame embodiment provides the normally closed valve 29 as a means to control the time and duration of the discharge of the fluid. In this embodiment, the method of pressurization or pressure-producing mechanism is supplied by existing technology, such as by use of a $CO_2$ cartridge 27 attached by way of existing connecting/adaptor technology 32. The $CO_2$ enters the closed system through an opening in the ventral (i.e., bottom) side of the bicycle top tube and into the $CO_2$ gas chamber 30 as shown in FIG. 9. The pressure created in the $CO_2$ chamber 30 drives the plunger head 34 forward, which in turn creates pressure on the fluid held in the fluid reservoir 7. The pressurized fluid is prevented from flowing out of the reservoir 7 and through the adjustable spray nozzle 13, by the normally closed solenoid valve 29. The solenoid valve 29 can be implemented using existing solenoid design technology. FIG. 11 illustrates a detail of the solenoid valve 29 in an example embodiment. When the operator wants to discharge fluid he/she depresses/activates the solenoid actuator button 26 located on either the left or right side of the bicycle handlebars. When the solenoid-actuator button 26 is pressed, an electrical circuit is completed (see FIG. 11, circuit 38), which in turn opens the solenoid valve 29 and allows the fluid to flow from the pressurized fluid reservoir 7, through the valve 29, the tubing 18, and out to the adjustable spray nozzle 13 as shown in FIG. 9. Additional features in this embodiment, as shown in FIG. 9, include opening 20 through which the fluid is poured into the in-frame fluid reservoir 7. It should be noted that the plunger head 34 moves in an anterior-posterior direction as indicated by arrows 57 under the influence of the relative pressures created by either the fluid or $CO_2$ gas in their respective chambers. The $CO_2$ cartridge 27 can be attached to the bike top tube and held in place below the bike top tube by a bracket 32. The $CO_2$ bracket 32 can be attached to the bicycle top tube and held in place by zip ties 1 (e.g., see FIG. 10). The electrical wires that connect the solenoid valve 29 can be located inside the bike frame along with the fluid tubing leading from the output side of the solenoid valve 29 to the adjustable spray nozzle 13. The electrical wires and the fluid tubing can exit the in-frame spray unit through an opening 56 located on the top of the bicycle top tube just behind the bicycle handlebar stem as shown in FIG. 9.

FIG. 10 illustrates the general and relative positions and locations of the in-frame embodiment illustrated in FIG. 9 as it appears on the bicycle frame from a side view perspective. One can readily observe and appreciate the uniqueness, simplicity, and efficiency of the design of this example embodiment. FIG. 10 illustrates the externally visible components of the in-frame embodiment, including the zip ties 1 that secure both the $CO_2$ cartridge bracket 32 that holds the $CO_2$ cartridge 27 onto the bicycle frame and the female stem bracket 2 to the handlebar stem. Also visible in this illustration are the fluid fill cap/opening 20, the fluid tubing 18 that delivers the fluid to the spray head 12, by traveling through the assembly riser 4, the button 26 that actuates the solenoid valve 29 and lastly the $CO_2$ cartridge connector 31 that allows for the $CO_2$ gas to enter the $CO_2$ chamber 30 inside the bicycle frame top tube.

FIG. 11 illustrates the general design of an example embodiment of the normally closed solenoid valve 29 that controls the flow of the pressurized fluid from the fluid reservoir 7 to the adjustable spray nozzle 13. In general, existing solenoid valve technology can be used with the disclosed embodiment. The normally closed solenoid valve 29 can be used to control the time and duration of the discharge of fluid by the user. As shown in FIG. 11, the normally closed solenoid valve 29 can be used to control the flow of fluid through channel 36. The solenoid valve 29 can be opened or closed thereby causing a cylinder to move up or down in a sealed channel. When the cylinder is in the "up" position, the valve is opened, which allows the fluid from the pressurized fluid reservoir 7 to enter through the input flow opening 36 and flow in the direction of the arrow 35 and out through the output flow opening 37 and thus on to the adjustable spray nozzle 13. The electrical circuit 38 allows the operator to control both the time and duration of the discharge of fluid.

FIG. 12 illustrates the general design of the normally closed automated valve 25 used in an example embodiment. FIG. 12 illustrates the internal workings of the automated-valve mechanisms referenced in the descriptions of FIGS. 5 through 8 as the means that allow the user to control the time and duration of the discharge of fluid. In this configuration, the valve 25 includes both a horizontal fluid channel 55 and a vertical plunger channel 54 that connect and are contiguous in the middle of the valve block as shown in FIG. 12. This normally closed valve 25 is maintained in that disposition by means of a cylinder, the automated-valve plunger 41, and a spring 23 that is located in the bottom of channel 54. The spring 23 forces the cylinder up such that an opening/orifice 39 located approximately in the center of the cylinder is displaced above and out of the contiguous path that would allow fluid from the pressurized side of the valve 25 to flow into the input/flow opening 36 in the direction indicated by the arrow 35 and through the output/flow 55 opening and on to the adjustable spray nozzle 13.

FIGS. 13 and 14 illustrate an example embodiment of a flange-lock design wherein clips provide for the attachment and connection of the assembly riser and the spray unit to the bicycle frame and to each other. These example embodiments illustrate various designs for connecting the male and female segments of both the stem and spray unit brackets previously referenced. In this bracket embodiment, the bracket is referred to as a flange-lock bracket design.

Referring to FIG. 13, the female stem bracket 2 contains four tabs 42 that are molded into the bracket and serve to anchor or hold the zip ties 1 in place as they hold the female bracket 2 to the handlebar stem. The female bracket 2 also contains a female groove 44 that allows for the male end of the male stem bracket 3 to be inserted in the direction indicated by the arrow 46 shown in FIG. 13. In order to insert the male stem bracket 3, the user first pulls the flange in a downward direction (e.g., see FIG. 14, directional notation 47) and fully below the plane in which the female groove lies. Once the male stem bracket 3 is fully inserted, the user can release the flange. Because the flange is constructed to be at rest in the upward position, the flange will retract to a point where its position will prevent the male stem bracket 3 from slipping out of the female stem bracket 2.

It will also be observed that the male stem bracket 3 can be integral to or molded into the assembly riser 4 and thus connects the assembly riser 4 to the bicycle frame. Likewise the female spray unit bracket 6, located at the anterior (i.e., forward) terminus of the assembly riser 4, can also be molded into the assembly riser 4 and uses the same flange-lock design (described above) to secure the male spray unit bracket 5 once inserted. The specific features and function of the male stem bracket 3 are shown in FIG. 13. FIG. 13 also shows the relative positions/locations of the assembly riser base 45, the assembly riser 4, and the female spray unit bracket 6.

FIG. 14 illustrates an example embodiment of a flange-lock design of FIG. 13 from a side view perspective. Key to this illustration is the direction of movement 47 for the flange-lock 43.

FIGS. 15, 16, and 17 illustrate an example embodiment of a snap clip design wherein clips provide for the attachment and connection of the assembly riser and the spray unit to the bicycle frame and to each other. The snap clip design is an alternative embodiment of a mechanism for connecting the male and female brackets to the handlebar stem or to the spray unit. In this configuration as shown in FIG. 15, the female stem bracket 2 retains the same design specifics and features, namely the zip tie tabs 42 and the female insertion groove 44; however, the means of securing the male stem bracket 3, once fully inserted, involve the use of existing design technology referred to herein as a snap-on clip. The relative location of the snap-on clip 48 can readily be seen in FIGS. 15 through 17. In a manner similar to the embodiment shown in FIGS. 13 and 14, FIGS. 15 through 17 illustrate the direction of male stem bracket 3 insertion 46, the assembly riser base 46, the assembly riser 4 and the female spray unit bracket 6 at the terminal and forward end of the assembly riser 4.

FIG. 16 illustrates an example embodiment of the snap clip design of FIG. 15 from a side view perspective. One notable, observable design distinction is the mechanism for securing the male stem bracket 3 once fully inserted. This is shown by the snap-on clip 48, as illustrated in FIG. 16. The other features visible are previously referenced, described, and illustrated.

FIG. 17 illustrates an example embodiment of the snap clip design of FIG. 15 from a front view perspective. In this drawing, the features and functions that are more clearly demonstrated are, for example, the snap-on clips 48, the female groove 44, and the relative insertion relationship with respect to the male spray unit bracket 5 and female spray unit bracket 6. Also illustrated from this perspective are: the assembly riser 4, the spray unit 16, and the spray head 12.

FIGS. 18 and 19 illustrate a modification of the spray nozzle in an example embodiment to include multiple nozzles that may be independently adjusted as to their direction of spray. In this example, an alternative embodiment of an adjustable spray nozzle 13 for the purposes of evaporative cooling is shown. The features and functions described above and shown in previously referenced illustrations are evident, such as the functional spray unit 16, the spray head(s) 12, assembly riser 4, handlebar stem 14, and handlebars 15. The enhancement in this embodiment is the presence of multiple (e.g., three) spray heads 12 with the corresponding number of adjustable spray nozzles. This alternative embodiment provides for additional sources of fluid discharge that can be directed at different angles, such as a first nozzle directed toward the rider's face while other nozzles can be directed to spray mist toward the rider's upper chest and torso. In this manner, different parts of a rider's body can be cooled at the same time.

FIG. 19 illustrates an expanded view of the embodiment illustrated in FIG. 18 and described above, wherein the functional spray unit 16 includes a primary adjustable spray nozzle, top 13, directed at a rider's face and two secondary adjustable spray nozzles, sides 13, directed at a rider's torso. Each adjustable spray nozzle 13 is, as in prior presentations, integral to the spray head(s) 12.

Figure 20:
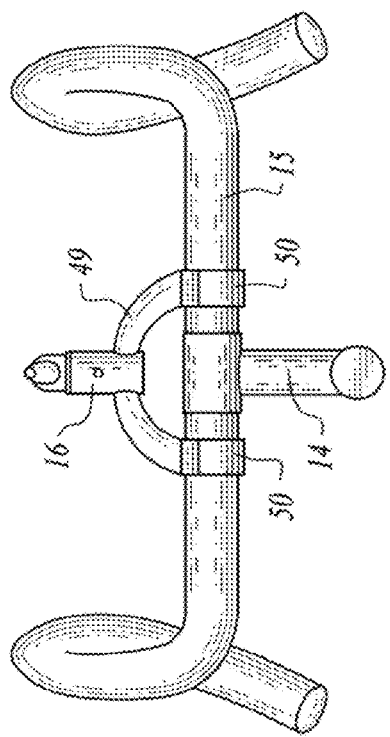
FIGS. 20 through 23 illustrate various example embodiments of attachment designs and attachment locations for either the manual-trigger or automated-valve embodiments. In particular.
Figure 21:
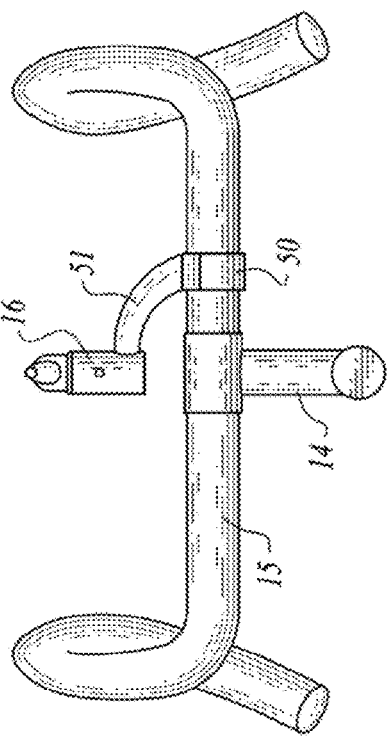
Figure 22:
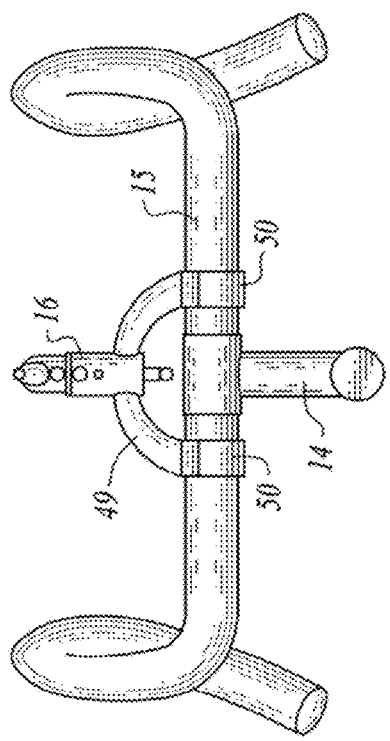
Figure 23:
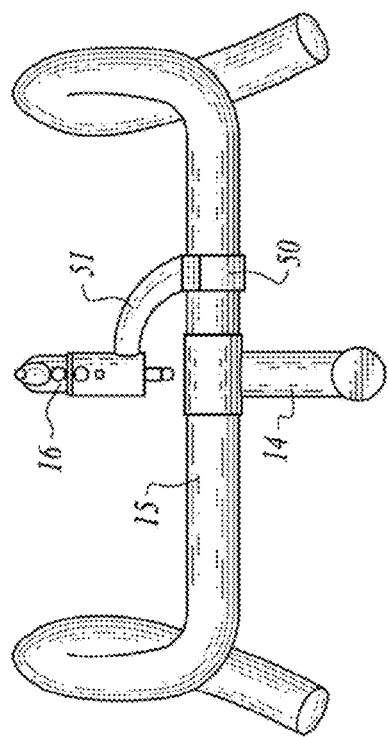
Figure 27:
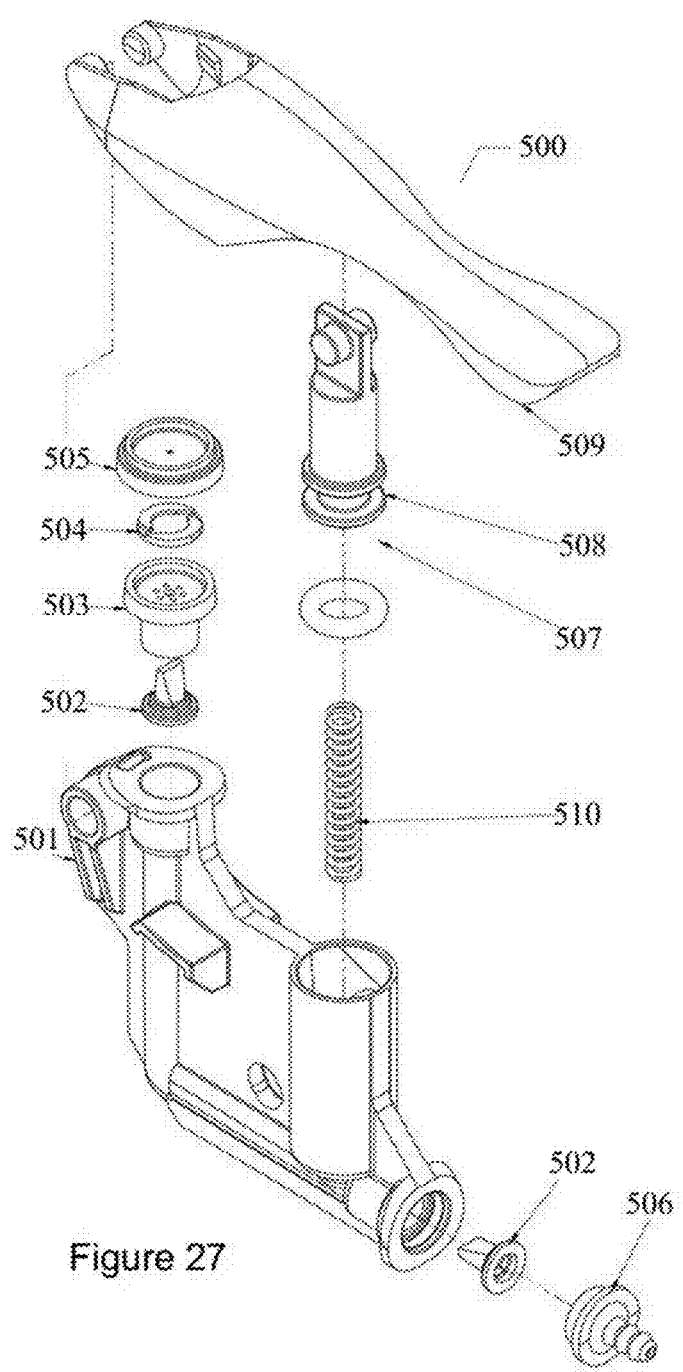
FIGS. 27 through 35 illustrate another example embodiment of a bicycle misting system.
Figure 28:
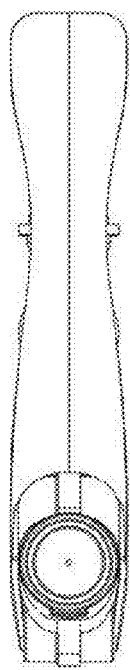
Figure 30:
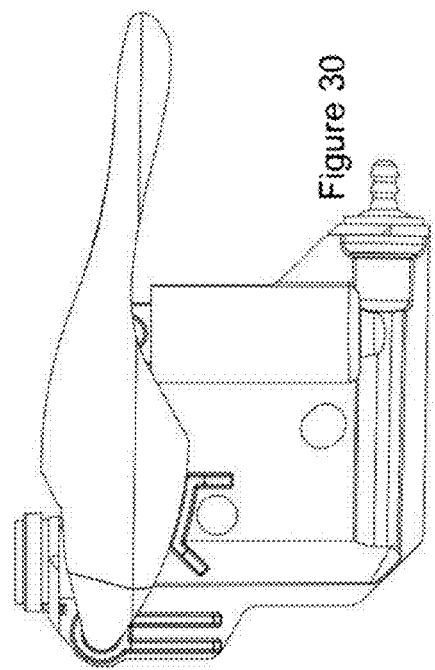
Figure 31:
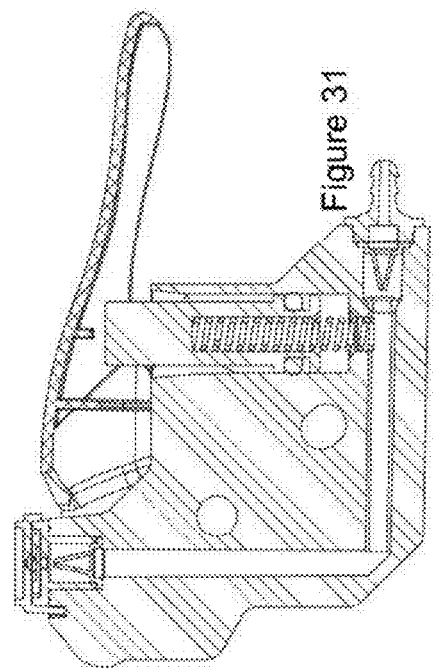
Figure 29:
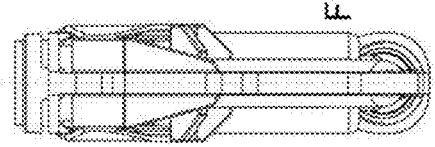
Figure 32:
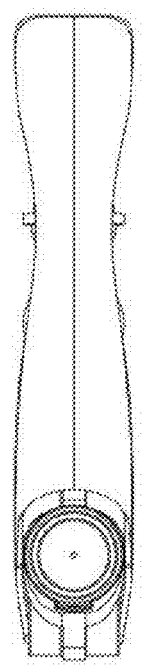
Figure 35:
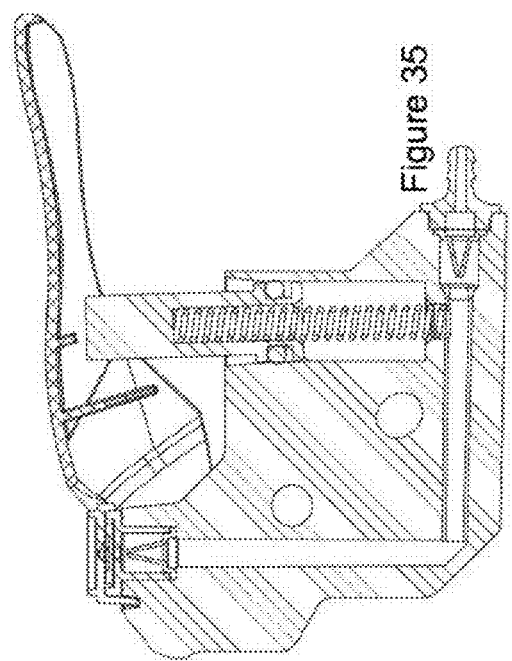
Figure 34:
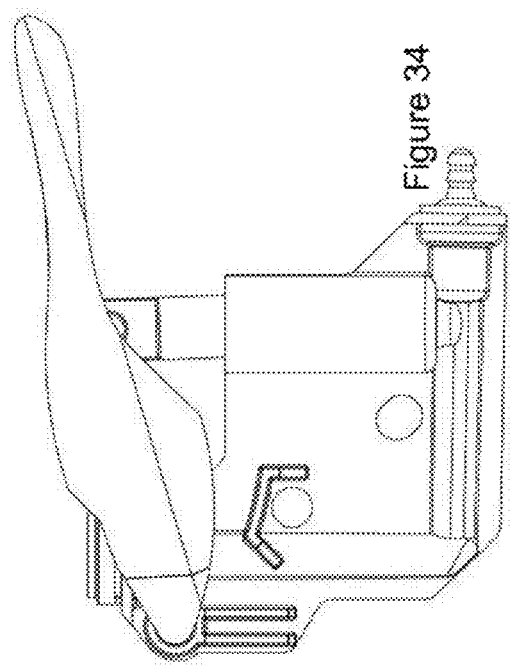
Figure 33:
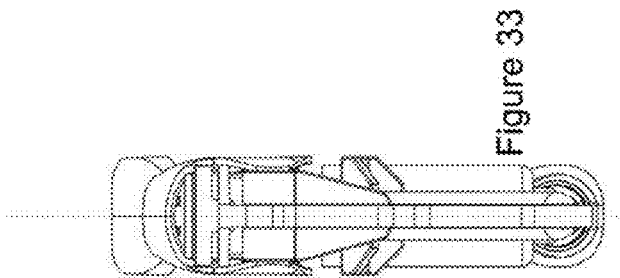
Figure 36:
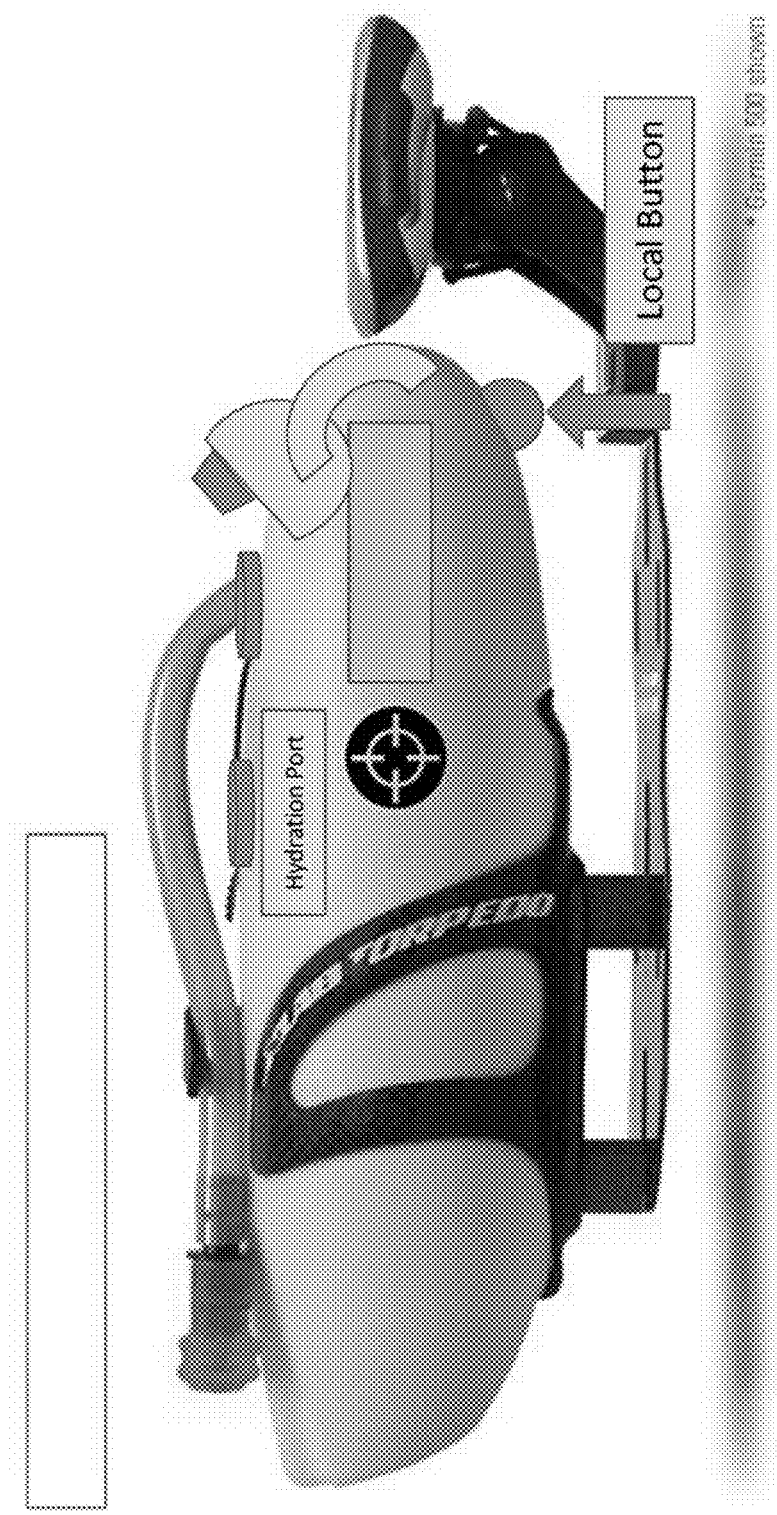
FIGS. 36 through 39 illustrate another example embodiment of a bicycle hydration and misting system.
Figure 37:
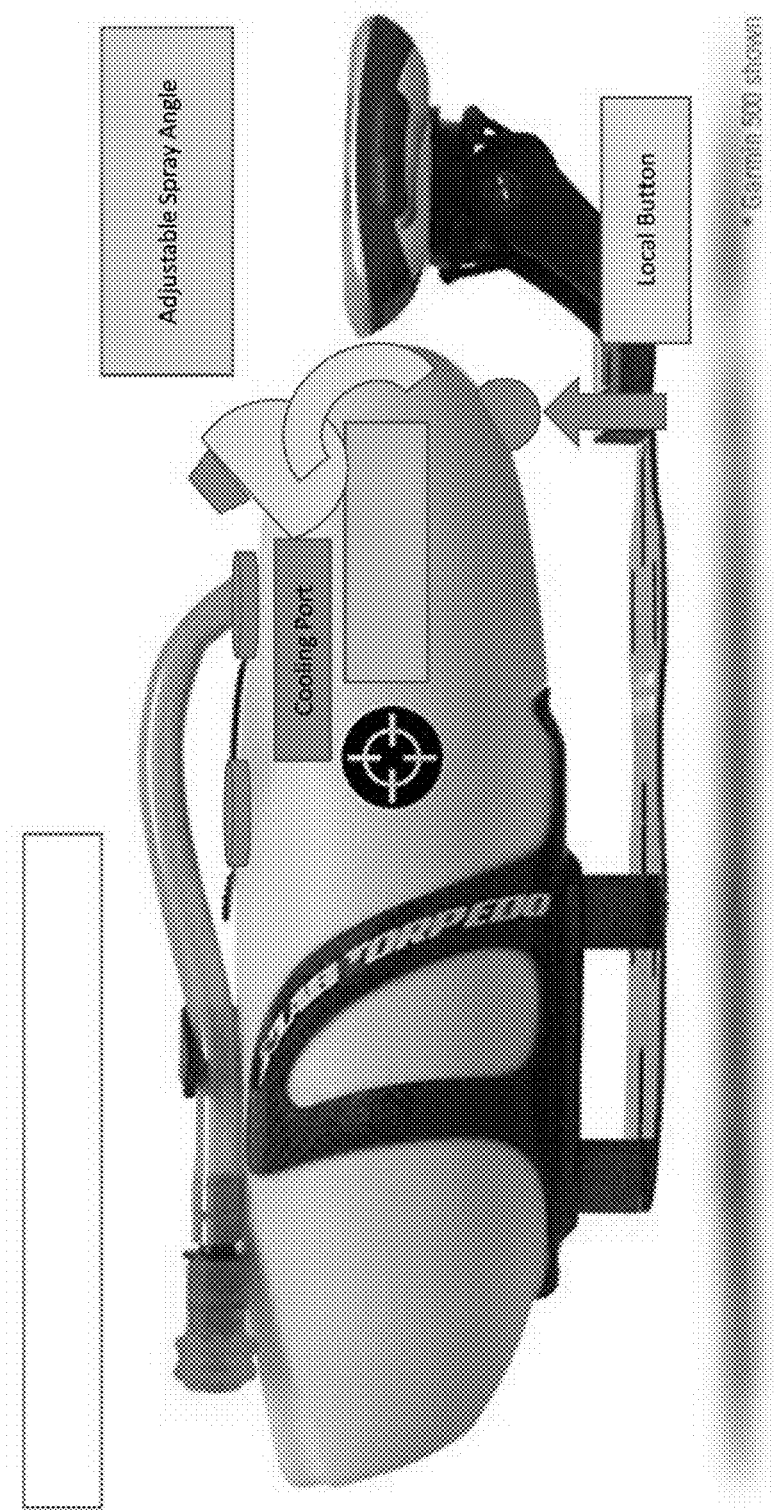
Figure 38:
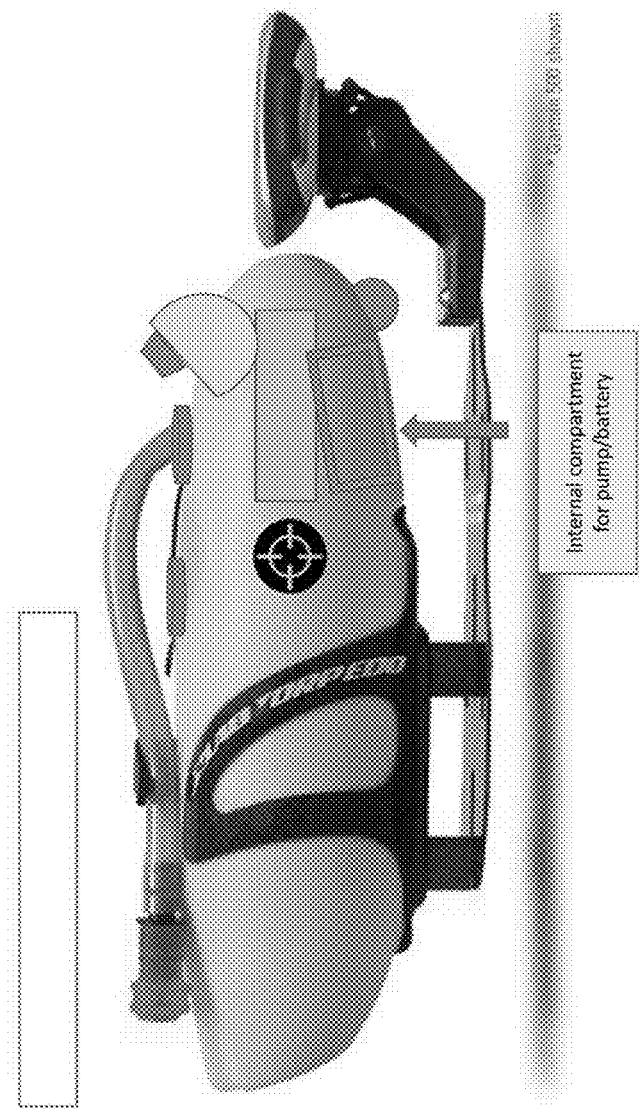
Figure 39:
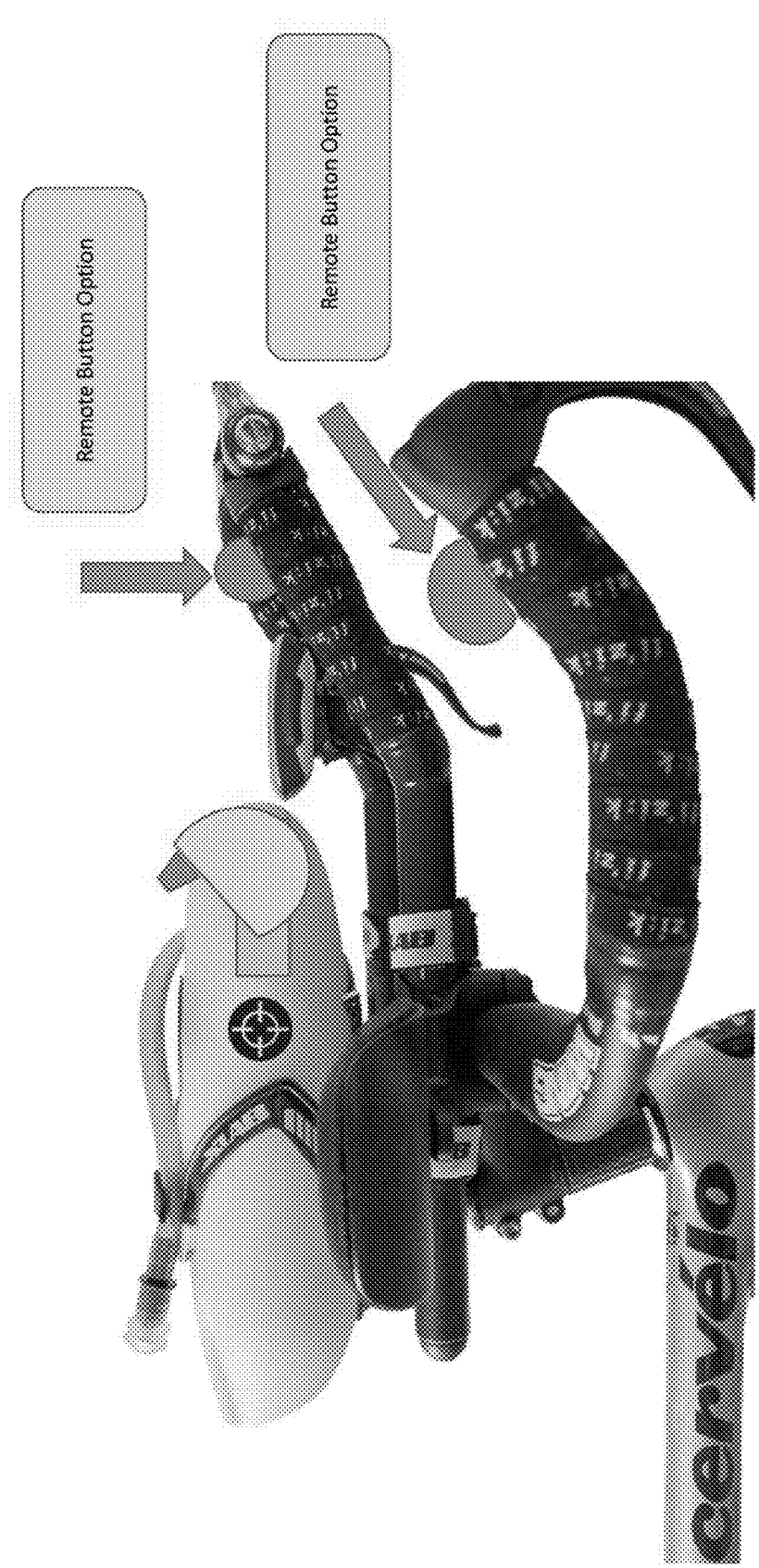

FIGS. 20 through 23 illustrate various example embodiments of attachment designs and attachment locations for either the manual-trigger or automated-valve embodiments. In particular, FIGS. 20 and 21 illustrate a variety of attachment designs and attachment locations for the manual-trigger embodiment, while the location and function of the spray unit remains the same. FIGS. 22 and 23 illustrate alternate attachment designs and attachment locations for the automated embodiments, while the location and function of the spray unit remains the same.

Referring to FIG. 20, a view illustrates a variation on the means of attachment of the functional spray unit 16 in a bilateral fashion whereas the means of attaching or connecting the spray unit 16 to the bicycle frame is accomplished by clips or handlebar attachments 50 removably attached to the handlebars on either side of the handlebar stem 14, thus a bilateral attachment means. It can also be observed that the previously described assembly riser 4 has, in this embodiment, the functional equivalent feature referred to as the assembly mount 49. All other features, functions and intentions for the previously described and illustrated embodiments for the manual-trigger model remain similar.

Referring to FIG. 21, a view illustrates a unilateral mounting embodiment of the manual-trigger model, wherein the assembly mount 51 is unilaterally attached to the handlebars 15 on one side only, either the right or left side of the handlebar stem 14. The functional spray unit 16 is thus connected to the bicycle frame by the means of only a one-sided connection, thus a unilateral mounting. As mentioned above, all other features, functions and intents of the manual-trigger model remain the same.

Referring to FIG. 22, a view illustrates a bilateral attachment for the automated-valve model, previously illustrated and described. It can readily be seen that the location and orientation of the functional spray unit 16 is the same, as well as all the previously referenced features, functions and intentions, in this alternative embodiment. As shown in FIG. 22, this alternative embodiment includes bilateral assembly mount 49 and the handlebar attachment clips 50, attached to the handlebars 15 on both sides of the handlebar stem 14.

Referring to FIG. 23, a view illustrates a unilateral mounting embodiment for the automated-valve model, previously illustrated and described. It can readily be seen that the location and orientation of the functional spray unit 16 is the same, as well as all the previously referenced features, functions and intentions, in this alternative embodiment. As shown in FIG. 23, this alternative embodiment includes unilateral assembly mount 51 and the handlebar attachment clip 50, which in this embodiment is connected to the handlebars 15 on only one side of the handlebar stem 14 on either the right or left side.

FIGS. 24 through 26 illustrate another example embodiment of a bicycle misting system 100 having separable components. Referring to FIG. 24, the example embodiment of the bicycle misting system 100 is shown to include a sprayer assembly 102 (also denoted herein as the trigger-activated mist dispenser), a stem bracket 104 (also denoted herein as the attachment bracket), and an attachable fluid reservoir 106. The sprayer assembly 102 includes a hand grip portion including a trigger or trigger mechanism 110 for drawing cooling fluid from attachable reservoir 106 through transfer tubing 105 when the trigger 110 is activated and the attachable reservoir 106 is attached as shown in FIG. 26. The cooling fluid is drawn from the attachable reservoir 106 through tubing 105 and dispersed as an aerosol through the nozzle 109 at one end of the hand grip portion of the sprayer assembly 102. The hand grip portion of the sprayer assembly 102 is rotatably coupled to a mounting portion of the sprayer assembly 102 at a connecting rod 107. The hand grip portion of the sprayer assembly 102 is configured to rotate upwards or downwards about connecting rod 107 as shown by the dashed lines 108 illustrated in FIGS. 24 and 26. In one embodiment, the hand grip portion of the sprayer assembly 102 is configured to rotate upwards from a horizontal plane by at least 45 degrees. The hand grip portion of the sprayer assembly 102 can also be configured with a rippled lower surface and/or a rubber-coated surface for better friction when gripped by a hand of the rider.

The attachable reservoir 106 is configured with a reservoir coupling mechanism comprising a top surface formed to removably slide into a groove in the lower side of the mounting portion of the sprayer assembly 102 as shown in FIGS. 25 and 26. In various embodiments, the attachable reservoir 106 can be fabricated in a variety of sizes and fluid-holding capacities. The attachable reservoir 106 can be fabricated in a larger size and greater fluid-holding capacity to provide a greater volume of cooling fluid for particularly hot/dry weather or longer rides. Similarly, the attachable reservoir 106 can be fabricated in a smaller size with a smaller fluid-holding capacity to provide a lesser volume of cooling fluid and less weight for less hot/dry weather or shorter rides. The attachable reservoir 106 can also be fabricated in a relatively narrow dimension in a plane parallel to the handlebars of a bicycle. In this manner, the attachable reservoir 106 presents relatively little wind resistance when attached to a moving bicycle.

The mounting portion of the sprayer assembly 102 is also configured with a bicycle mounting mechanism comprising a groove in the upper side of the mounting portion of the sprayer assembly 102 to be removably coupled to the stem bracket 104 as shown in FIGS. 25 and 26. The stem bracket 104 can be attached to a bicycle handlebar stem 120 with zip ties or other attachment mechanism as shown in FIG. 25. Such an arrangement allows the sprayer assembly 102 to be conveniently attached to or removed from the bicycle.

As described above, the attachable reservoir 106 is configured to be removably coupled to the sprayer assembly 102 as shown in FIGS. 25 and 26. The attachable reservoir 106 includes a fill hole at the top, which can be used to fill the attachable reservoir 106 with a cooling fluid, such as water. The fill hole in the attachable reservoir 106 is also configured to receive an end of the tubing 105 as shown in FIG. 24. When the attachable reservoir 106 is removably coupled to the sprayer assembly 102, the end of the tubing 105 is immersed in the cooling fluid in the attachable reservoir 106. This immersion of the tubing 105 enables the cooling fluid to be drawn from the attachable reservoir 106 through tubing 105 to the nozzle 109 when the trigger 110 is activated. As shown in FIG. 25, the sprayer assembly 102, with the attachable reservoir 106 removably coupled to the sprayer assembly 102, can be removably attached to a bicycle using the stem bracket 104, which can be attached to a bicycle handlebar stem 120 as shown in FIG. 25. As a result, a light-weight, safe, and effective bicycle misting system and apparatus is provided.

FIGS. 27 through 35 illustrate another example embodiment of a bicycle misting system 500. In particular, an example embodiment 500 shown in FIG. 27 includes: a spray housing 501, a duckbill minivalve 502, a nozzle base 503, a nozzle flow diverter 504, a nozzle cap 505, an inlet 506, an o-ring 507, a piston 508, a trigger 509, and a pump spring 510.

The example embodiment can include any type of button (e.g., mechanical or electronic) and any type of actuator mechanism or device. The nozzle can include any spraying device, dispensing mechanism, or delivery system. The transfer tubing can include any mechanism that couples or connects a water reservoir to a dispensing device. In various embodiments, the reservoir can be securely coupled to the dispensing device using a slideable mechanism, or other mechanism that can be snapped, clamped, screwed, twisted, or magnetically attached. The reservoir can be removably or permanently coupled to the dispensing device. The stem bracket can include any method or mechanism of attachment to the bicycle.

In an example embodiment, the fluid reservoir and nozzle can be positioned at various locations/positions. For example, the internal reservoir and nozzle can be positioned around the bike frame. The nozzle can be positioned to spray the arms, legs, torso, and back of a rider.

In an example embodiment, the self-contained bicycle misting apparatus can include a trigger-activated mist dispenser configured to rotate upwards or downwards relative to a horizontal plane or in any other direction.

In an example embodiment, the self-contained bicycle misting apparatus can include a stem bracket that provides a unilateral mounting bracket for attachment of the trigger-activated mist dispenser to the bicycle at a single location. The location can be on the handlebars, but is not restricted to the handlebars. In an example embodiment, the stem bracket provides a unilateral mounting bracket for attachment of the trigger-activated mist dispenser to the aerobars or other suitable locations on the bike such that cooling by way of a misting device can be effected. Additionally, nozzles can be placed at other positions on the bike such as: the handlebars, the downtube, the seat stays, the seat post, the top bar, or the chain stays.

In an example embodiment, the fluid reservoir is fabricated in a variety of sizes and fluid-holding capacities. The variety of sizes and fluid-holding capacities can include structures to facilitate the controlled flow of the cooling fluid to the nozzle while reducing or eliminating unwanted leaking of cooling fluid through the nozzle when the dispensing mechanism is not being activated (e.g., not in use). In a particular embodiment, the reservoirs allow for internal baffles to be manufactured to break up the momentum of water on rough roads due to vibration forces that force water up through the tubing and out the nozzle.

In an example embodiment, a pressurized fluid reservoir for retaining fluid includes, but is not limited to, existing pressuring technologies, such as gas/air pressure, mechanical force, hydraulic force, or mechanical or electrical pumps/pumping. In an example embodiment, the spray can be dispensed by way of a mechanical or electrical pump. The distinguishing feature is that in one embodiment, a pump pressurizes the fluid. In another embodiment, a pump actually delivers or dispenses the fluid.

In an example embodiment, a valve-activated mist dispenser can include a mechanical and/or electrical mechanism. A wire activated and wirelessly (e.g., remotely) activated solenoid or other gating mechanism/design can also be used. The purpose is to both control the flow of cooling fluid when desired and restrict the flow of cooling fluid when not desired.

In an example embodiment, a bilateral mounting bracket is included for attachment to a bicycle at two different locations. An attachment bracket is included for removable attachment of the apparatus to the bilateral mounting bracket. Bilateral mounting can include attachment to handlebars either on the right side, left side, or both right and left side. In various embodiments, handlebars can include standard bicycle handlebars, including road bike, mountain bike, triathlon (aerobars), commuter bike, and/or cruiser bikes.

In an example embodiment, a unilateral mounting bracket is included for attachment to a bicycle at a single location. An attachment bracket is included for removable attachment of the apparatus to the unilateral mounting bracket.

In an example embodiment, a pressure-producing mechanism can include a $CO_2$ cartridge. Additionally, any other pressure producing system or device, such as mechanical pressure, pump generated pressure (e.g., air pressure) or a direct pumping mechanism or device that directly delivers the cooling fluid to the misting dispenser-nozzle can be used.

In an example embodiment, a valve mechanism can include an electrical solenoid for activation of the valve mechanism. In other embodiments, the valve mechanism is not limited to an electrical solenoid.

In an example embodiment, a self-contained bicycle misting apparatus includes a misting apparatus configured to deliver a pre-determined amount of cooling fluid with each activation of the trigger mechanism. In various embodiments, the misting apparatus can be configured to deliver a spray with uniquely designed and intended characteristics. Such characteristics include: the size and mass of the cooling fluid droplets, the shape of the spray pattern and surface area when it contacts or hits the rider's face or other targeted area on the rider's body. The misting apparatus can be configured to selectively target the face, upper chest, torso, lower chest, head, ears, neck, arms, legs, or other parts of the rider's body. The pre-determined spray pattern and targeted area of the body can be specifically designed to maximize the effectiveness of cooling and the positive rider perceptions of the cooling fluid impacting the targeted portions of the rider's body. The pre-determined spray pattern characteristics can include: the size and mass of the spray droplets which allow for the spray to reach the rider's targeted areas of the body at speeds (e.g., windspeeds) up to 30 mph and a distance between the misting dispenser and the rider's targeted body area of up to three feet. The spray pattern is designed and configured to be either an approximate circle of about three inches in diameter or an approximate rectangle with dimensions of width two inches and length six inches. The spray pattern at the distances to impact the rider can be designed and configured to cover a surface area of approximately seven square inches (e.g., in a circular pattern) or approximately twelve square inches (e.g., in a rectangular pattern). The spray characteristics and pattern are likewise designed and configured to allow the rider to target the desired areas from the head, face, ears, neck, upper chest or torso while simultaneously avoiding areas not desired to be targeted with the cooling fluid. Additionally, the spray characteristics and pattern are specifically designed for ease of use and rider safety.

As described above, the various embodiments represent an improvement and ease of use for cyclists. The beneficial features of the various embodiments include the following, for example:

Simplicity of Design:

The various embodiments presented herein represent an improvement in simplicity from the following aspects:

Self-contained unit

No tubes or tubing required, that run along the bicycle frame in the manual-trigger and automated-valve embodiments No fluid container or reservoir attached to the bicycle frame that competes for fluid and/or space for hydration purposes Improved appearance and integration into the look and feel of the bicycle frame Form and Functionality:

The various embodiments presented herein represent an improvement in form and functionality from the following aspects:

Set up and break down. A cyclist can be quite particular about the ease of use and accessibility of their cycling accessories. The various embodiments allow for very easy initial set up or installation and can also be broken down by its component parts when the cyclist determines it is not necessary or desired due to choice or conditions for any current ride.

The various embodiments provide efficient evaporative cooling, given the competition for space, fluid volume, and weight on the bike frame for water or other fluids for the purposes of hydration.

Interchangeability—The various embodiments allow the cyclist to easily carry extra water for cooling purposes and to exchange fluid reservoirs conveniently.

The self-contained unit design presents a form that integrates stylistically into and with the bicycle frame. This is likely to gain acceptance and use in the cycling community, thus effecting, the previously mentioned benefits.

The various embodiments provide a forwardly projected reservoir and spray nozzle that allows for the effect of wind and forward motion on the angle and direction of the water spray such that the cyclist does not have to look down or bend over to access the spray and obtain the benefits of evaporative cooling.

Adjustable spray types—the spray nozzle is constructed to allow the cyclist to change/vary the pattern of the fluid discharged from the nozzle, from stream, to spray, or to mist. This allows the cyclist to maximize the intended benefits from the use of the various embodiments.

Safety and Ease of Use:

The various embodiments presented herein represent an improvement in safety and ease of use from the following aspects:

The forwardly projected and angled nozzle head allows the cyclist to maintain a heads-up position while using the device, improving visibility and awareness of the road/terrain ahead, thus improving safety.

In both the manual and automated configurations, the cyclist's hand does not have to come off the handlebar when activating the device. While the hand used to actuate the device may be repositioned from the normal riding position, it does not have to leave the handlebar; thus, any concerns about riding stability and safety are not an issue with the various embodiments.

Design, Use, and Benefit Efficiency—Overall Riding Experience:

The various embodiments presented herein represent efficiency improvements in the following aspects:

The various embodiments require minimal amount of fluid/water to be carried for the purpose of evaporative cooling The various embodiments minimize the extra weight of excess fluid carried for cooling Particular embodiments position the minimally required water in the front of the bicycle, which eliminates the competition for space on the bicycle frame for fluid intended for hydration.

These factors rebalance the dynamics cyclists face when riding in elevated or extreme temperatures. The cyclist has independent sources and delivery systems for hydration and cooling and they do not compete for space, weight and utility.

It is anticipated that the combination of the riding benefits with the use of the various embodiments allow riders increased comfort while riding, an ability to extend riding time, improved performance—reducing the physiological effects of overheating, and the ability or perceived ability to ride under conditions of elevated or extreme heat.

Miscellaneous Benefits:

The various embodiments presented herein represent other improvements in the following aspects:

There is a benefit to cyclists of periodically spraying the cyclist's eyes with water. This dramatically reduces the stinging effect of sweat in the eyes that frequently occurs while riding. This stinging sweat issue is not a small factor in rider comfort, safety, and resolution. Traditionally, a rider will have to stop to pour water over the eyes to eliminate the stinging. This is not easily or safely done while riding. The various embodiments can be used to periodically spray the cyclist's eyes with water to mitigate the stinging effects of sweat.

Another benefit of the various embodiments, which also contributes to its overall effectiveness, is that when used in either the stream or spray mode, the cyclist can dispense water into the mouth. While this may not completely meet hydration needs, it does assist in the common experience of dry mouth while riding in conditions of elevated or extreme heat.

Aero Bar Hydration and Cooling System

FIGS. 36 through 39 illustrate another example embodiment of a bicycle hydration and misting system. Building on the designs disclosed herein, an on-board hydration and cooling system is implemented for TT and Triathlete bikes to provide the added benefit of effective and efficient cooling at the touch of a finger. This approach combines and completes two of the three physiological requirements of a sustainable performance and enjoyable ride into one product—Hydration+Fueling+Cooling.

An example embodiment provides among the features described below.

Integrated Container for Hydration and Cooling Capabilities—

The disclosed container provides for the containment in either one or multiple separate internal compartments water and/or other fluids for the dual purposes of drinking and spraying. Drinking for hydration and spraying for the effect of evaporative cooling.

Pump or Pressurized Methods for Delivering Water for Cooling (e.g., Spraying)—

An example embodiment can use the pump or pressurization systems disclosed in this patent disclosure. In general, the mechanism for spraying water from the disclosed container may be either by a pumping device or a pressurized system. The pump or pressure system allows for sufficient force to deliver water from the container/compartment to the cyclist's face while riding at speeds from 1 to 30 miles per hour.

One or Multiple Container Compartments Containing Water or Other Fluids for Hydration and Cooling—

The disclosed container can include two separate compartments with an internal waterproof divider that allows for compartmentalizing fluid for drinking and fluid for spraying to the rider's face. The divider may be adjustable to allow for variations in the proportion of water for drinking and water for cooling.

Adjustable Nozzle Positions—

As disclosed above, the spraying nozzle is designed such that it can be adjusted for different angles of spray to accommodate a variety of wind speeds and rider preferences for where and how the cooling fluid hits the rider's face.

Locking Mechanism for Adjustable Nozzle Positions—

The adjustable nozzle has a mechanism that securely "locks" the selected angle of spray into place such that the desired angle of spray will not move while the bike is in motion. The method of changing the spray angle is mechanical and can be done by hand.

Adjustable Spray Settings—Droplet Size and Pattern—

The disclosed spray nozzle can have a mechanism to adjust the characteristics of the spray from a "fine" or "finer" mist to a more robust and heavier/larger droplet size like a "spray." The effect or benefit intended with this variability is to provide the rider with a larger or smaller amount of water to the face per spray and to cover a larger or smaller surface area over the face per spray.

Wired and/or Wireless Pump Activation—

The method of actuation of the pump may be either by a wired or wireless electrical controlling device connected to the pump and an actuator "button" located on the container as well as remotely on the bicycle handlebars.

Wired and/or Wireless Valve Activation—

The method of actuation of the pressurizing device and/or valve may be either by a wired or wireless electrical controlling device connected to the pump and an actuator "button" located on the container as well as remotely on the bicycle handlebars.

Local (on the Bottle) and Remote Button Locations for Activation of Pump or Valves for Spraying—

The disclosed container can have on itself an actuator "button" for either the pump or pressuring valve as well as the capability of a secondary remote button for the same purpose of actuating the pump or valve.

Dual Ports and Separate Ports for Filling Fluid for Hydration and Cooling.

The disclosed container has separate ports/openings that are sealable and water tight to allow for refilling each compartment individually—drinking and cooling. Each port can be large enough to allow for refilling on the ride from a standard water bottle.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, a bicycle hydration and misting system or apparatus is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A self-contained bicycle misting and hydration apparatus comprising:
    a trigger-activated mist dispenser including:
        a trigger mechanism;
        a first nozzle; and
        a first fluid reservoir for retaining cooling fluid dispensed from the first nozzle when the trigger mechanism is activated;
    a hydration dispenser including:
        a second nozzle, separate from the first nozzle;
        a second fluid reservoir for retaining hydration fluid dispensed from the second nozzle, the first and second fluid reservoirs being integrated into a single container having a plurality of separate internal compartments; and
        a length of tubing coupling the second nozzle to the second fluid reservoir;
    a stem bracket being configured for attachment to a portion of a bicycle; and
    a mounting portion for removably coupling the container, the trigger-activated mist dispenser, and the hydration dispenser to the stem bracket.

2. The self-contained bicycle misting and hydration apparatus of claim 1 wherein the first nozzle is positioned forward of a handlebar and between aerobars of the bicycle.

3. The self-contained bicycle misting and hydration apparatus of claim 2 wherein the positioning forward of the handlebar and between aerobars of the bicycle is adjustable by a rider.

4. The self-contained bicycle misting and hydration apparatus of claim 1 wherein the first nozzle being further configured to rotate upwards relative to a horizontal plane.

5. The self-contained bicycle misting and hydration apparatus of claim 1 wherein the stem bracket provides a unilateral mounting bracket for attachment of the container, the trigger-activated mist dispenser, and the hydration dispenser to the bicycle at a single location.

6. The self-contained bicycle misting and hydration apparatus of claim 1 wherein the container is fabricated in a variety of sizes, shapes, and fluid-holding capacities.

7. The self-contained bicycle misting and hydration apparatus of claim 1 wherein the first nozzle is of a type from the group consisting of: a spraying device, a fluid dispensing mechanism, and a fluid delivery system.

8. The self-contained bicycle misting and hydration apparatus of claim 1 wherein the container can be removably coupled to the stem bracket using a slideable mechanism.

9. The self-contained bicycle misting and hydration apparatus of claim 1 wherein the first nozzle can be lockably adjusted for different angles of spray.

10. The self-contained bicycle misting and hydration apparatus of claim 1 wherein the second nozzle is of a type from the group consisting of: a fluid dispensing mechanism, and a fluid delivery system.

11. The self-contained bicycle misting and hydration apparatus of claim 1 wherein the second nozzle is coupled to a tube.

12. The self-contained bicycle misting and hydration apparatus of claim 1 wherein the container includes a plurality of sealable and water tight openings to allow independent filling of the first and second reservoirs individually.

13. The self-contained bicycle misting and hydration apparatus of claim 1 wherein the first nozzle including a mechanism to adjust droplet size characteristics of the cooling fluid dispensed from the first nozzle.

14. The self-contained bicycle misting and hydration apparatus of claim 1 wherein the trigger mechanism being configured to dispense cooling fluid from the first nozzle using a mechanism from the group consisting of: a pumping device, a pressurized system, and a plunger.

15. The self-contained bicycle misting and hydration apparatus of claim 1 wherein the trigger mechanism being configured for activation using a mechanism from the group consisting of: a wired electrical controlling device and wireless electrical controlling device.

16. The self-contained bicycle misting and hydration apparatus of claim 1 wherein at least a portion of the trigger mechanism being remotely located relative to the self-contained bicycle misting and hydration apparatus.

* * * * *